US005453945A

United States Patent [19]

Tucker et al.

[11] Patent Number: 5,453,945
[45] Date of Patent: Sep. 26, 1995

[54] METHOD FOR DECOMPOSING SIGNALS INTO EFFICIENT TIME-FREQUENCY REPRESENTATIONS FOR DATA COMPRESSION AND RECOGNITION

[76] Inventors: Michael R. Tucker, 10608 Ames La., Austin, Tex. 78739; Weiping Li, 1938 Hilltop Ter., Bethlehem, Pa. 18018

[21] Appl. No.: 182,692

[22] Filed: Jan. 13, 1994

[51] Int. Cl.$^6$ ............................................. G06F 15/332
[52] U.S. Cl. ...................... 364/725; 364/715.02; 382/251
[58] Field of Search ............................... 364/725, 715.02; 382/56

[56] References Cited

U.S. PATENT DOCUMENTS 5,287,529  2/1994  Pentland .................................. 364/725
5,347,479  9/1994  Miyazaki ................................ 364/725

Primary Examiner—David H. Malzahn
Attorney, Agent, or Firm—Baker & Botts

[57] ABSTRACT

A method for decomposing signals into efficient time-frequency representations for data compression and recognition which uses adaptable wavelet basis functions and concentrates a signal or image's information to a higher degree than methods based on the discrete fourier transform, the discrete cosine transform, the standard wavelet transform and known adaptive transform techniques. The purpose of the present invention is to enable data signals and images to be stored and transmitted very efficiently. The time-frequency plane is broken up into subspaces. The method determines the optimum basis function for each of the subspace regions. Basis functions are chosen such that much of the information in the signal is contained in a small number of coefficients. The resulting coefficients form a set that represents the signal in the most concentrated manner.

27 Claims, 14 Drawing Sheets

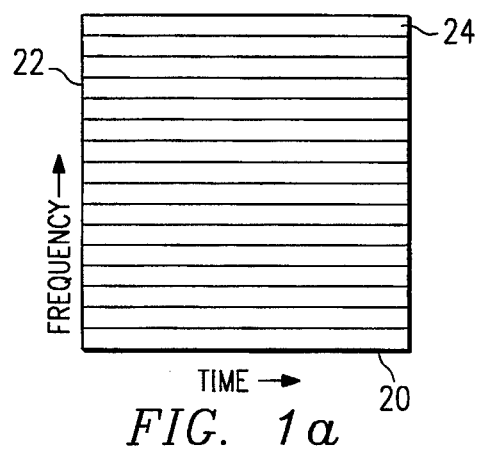
FIG. 1a
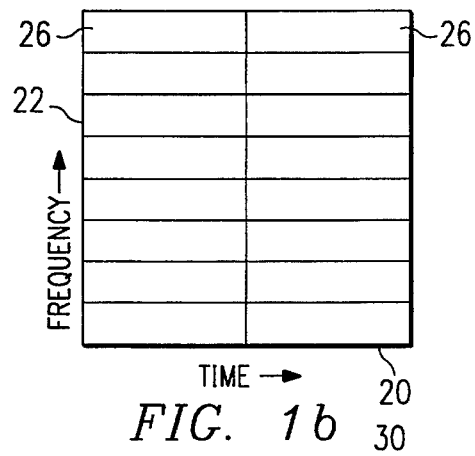
FIG. 1b
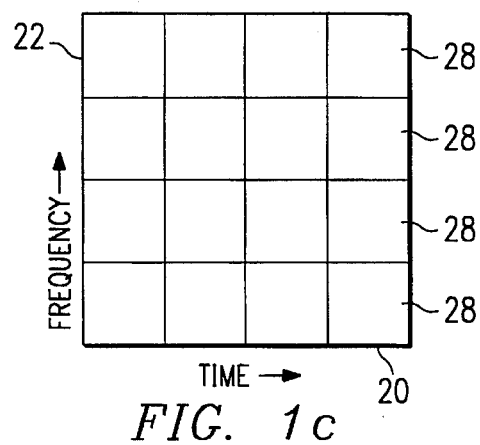
FIG. 1c
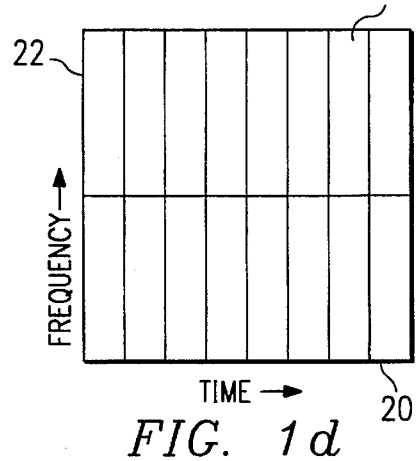
FIG. 1d
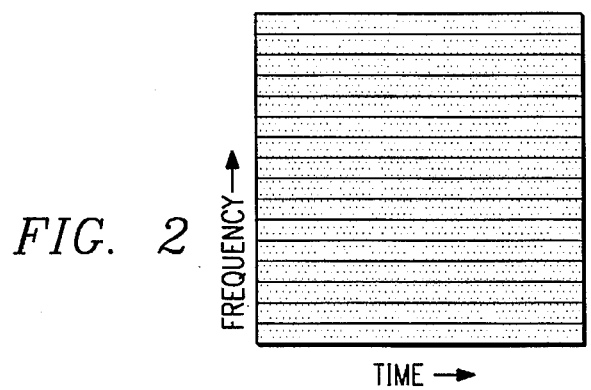
FIG. 2
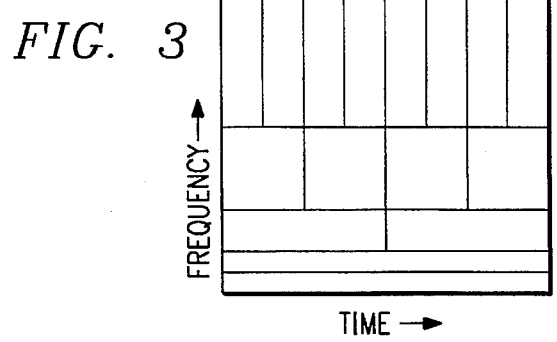
FIG. 3
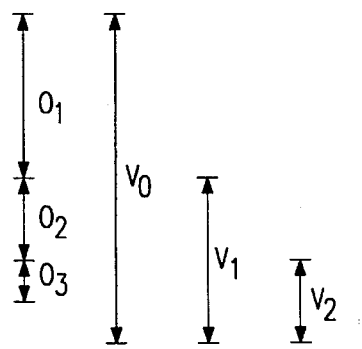

METHOD FOR DECOMPOSING SIGNALS INTO EFFICIENT TIME-FREQUENCY REPRESENTATIONS FOR DATA COMPRESSION AND RECOGNITION

TECHNICAL FIELD OF THE INVENTION

The present invention relates in general to the field of data compression and, more particularly, to a system and method for data compression using wavelet transforms.

BACKGROUND OF THE INVENTION

The discrete fourier transform (DFT) and the discrete cosine transform (DCT) are mathematical algorithms that break down signal data or images into their sine wave components. The sine wave components are also known as the basis components or the basis functions of the transform. When pieced back together, these components reproduce the original signal or image. Heretofore known embodiments of signal or image compression systems often use the DFT or DCT to break signals or images into their sinusoidal components and save only the largest components to compress the data. The rest of the components are discarded. This can result in a significant loss of information since the signal or image's information is spread over all of its sinusoidal components. For example, the sharp details of an X-ray image are smoothed when the image is compressed at high levels, thus reducing the value of the image. If a less-lossy, lower level of compression is used, data storage requirements are increased and a greater amount of time is required for data transmission. Similar problems occur in other data compression applications.

The standard wavelet transform (SWT) was recently developed as an improvement over the DFT to better represent signals having sharp changes or discontinuities. The basis functions of the SWT are wavelets, which are functions developed by mathematicians to better match signal discontinuities. However, wavelet functions do not produce good representations of sinusoidal signals. Therefore, neither the DFT nor the SWT produces a good signal decomposition for signals consisting of both sinusoidal sections and discontinuities.

A concentrated representation of an arbitrary signal tends to transform most of the signal information into a small number of basis elements. For example, if a sinusoid is transformed, the representation might consist of one large non-zero coefficient corresponding to a sinusoidal base element of the same frequency as the signal. If the transform has the ability to produce a concentrated representation, it is possible to compress the signal to a high degree and also produce an excellent set of features for pattern matching. This occurs because since the information in the signal is concentrated into a small number of coefficients making signal features such as edges, spikes, peaks, sinusoids, and noise easily identifiable.

Neither the SWT nor the DFT produces concentrated representations for arbitrary signals because both transforms use the same set of basis functions for every signal. The DFT is best able to represent sinusoidal functions, while the SWT is best able to represent discontinuities. However, neither transform produces concentrated representations for signals whose time-frequency characteristics are not well matched to the time-frequency characteristics of its basis functions.

In most signal processing applications, it is not possible to select the transform that produces the best level of compression for a particular signal. Techniques have been developed that attempt to adapt their basis functions to a particular signal's characteristics in order to produce high levels of compression for both signal discontinuities and sinusoids. The Karhunen-Loeve Transform and the entropy-based method of Coifman and Wickerhauser are examples of such transforms. However, these types of adaptable transform techniques have the following disadvantages: 1) the amount of data required to describe the coefficients being used is so great that the advantages of adaptive transform techniques are greatly negated; and 2) they are computationally intensive and there is no reliable way to perform the techniques in an efficient manner.

SUMMARY OF THE INVENTION

In accordance with the present invention, a data compression system is provided that substantially eliminates or reduces the disadvantages and problems associated with prior data compression systems. The present invention provides a data compression system employing an adaptive wavelet transform.

More specifically, the present invention concerns a system and method for data compression having a plurality of wavelet filters. As the data signal passes through the wavelet filters, the filters calculate basis coefficients corresponding to basis functions with a large variety of time and frequency resolutions. Comparison circuitry then compares the resulting basis coefficients and selects those coefficients having the lowest bit measure. The selected coefficients are quantized, reordered and efficiently coded using knowledge of their time-frequency characteristics and Huffman or arithmetic coding.

The wavelet filters may be implemented using a plurality of ROMS. Each of the ROMs calculates one bit of the basis coefficients. Shifter circuitry may operate to shift the output of the ROMs and adder circuitry may add the output of the shifter circuitry. The wavelet filter architecture may further include parallel loading circuitry to more efficiently compute wavelet basis coefficients.

The comparison circuitry may be comprised of a shift encoder and an adder to determine the number of bits needed to store a group of basis coefficients corresponding to a time-frequency region. It may also include a binary comparator to determine which set of basis coefficients can be stored with the least number of bits for a given time-frequency region and storage memory which may store the set of basis coefficient requiring the fewest number of bits.

A technical advantage of the present invention is its use of basis functions to compress data signals that closely mirror the data signal being compressed.

Another technical advantage of the present invention is its production of a concentrated time-frequency representation by choosing basis functions which are well-matched to a given signal's time-frequency characteristics.

Another technical advantage of the present invention is its determination of the optimum basis function for each subspace in the time-frequency plane by examining the bit measures for the groups of basis functions which span that time-frequency subspace.

Another technical advantage of the present invention is a reduction in the number of bits necessary to inform the decompressor of which basis coefficient are used to represent the signal.

Another technical advantage of the present invention is the use of hardware that can rapidly perform the wavelet filtering operation by not using any hardware multipliers.

Another technical advantage of the present invention in the use of hardware that can rapidly perform the wavelet filtering operation by employing circuitry which enables wavelet coefficients to be loaded in either a serial or parallel manner.

Another technical advantage of the present invention is the use of hardware that can rapidly perform the selection of the best basis coefficients.

Another technical advantage of the present invention is that the invention is not restricted to the use of any one type of wavelet function.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIGS. 1a–1d are coordinate views of the time-frequency plane;

FIG. 2 is a coordinate view of the time-frequency highlighting the basis coefficient used by the discrete fourier transform;

FIG. 3 is coordinate view of the time-frequency plane showing the mathematical subspaces used by the discrete standard wavelet transform;

DETAILED DESCRIPTION OF THE INVENTION

Figure 4:
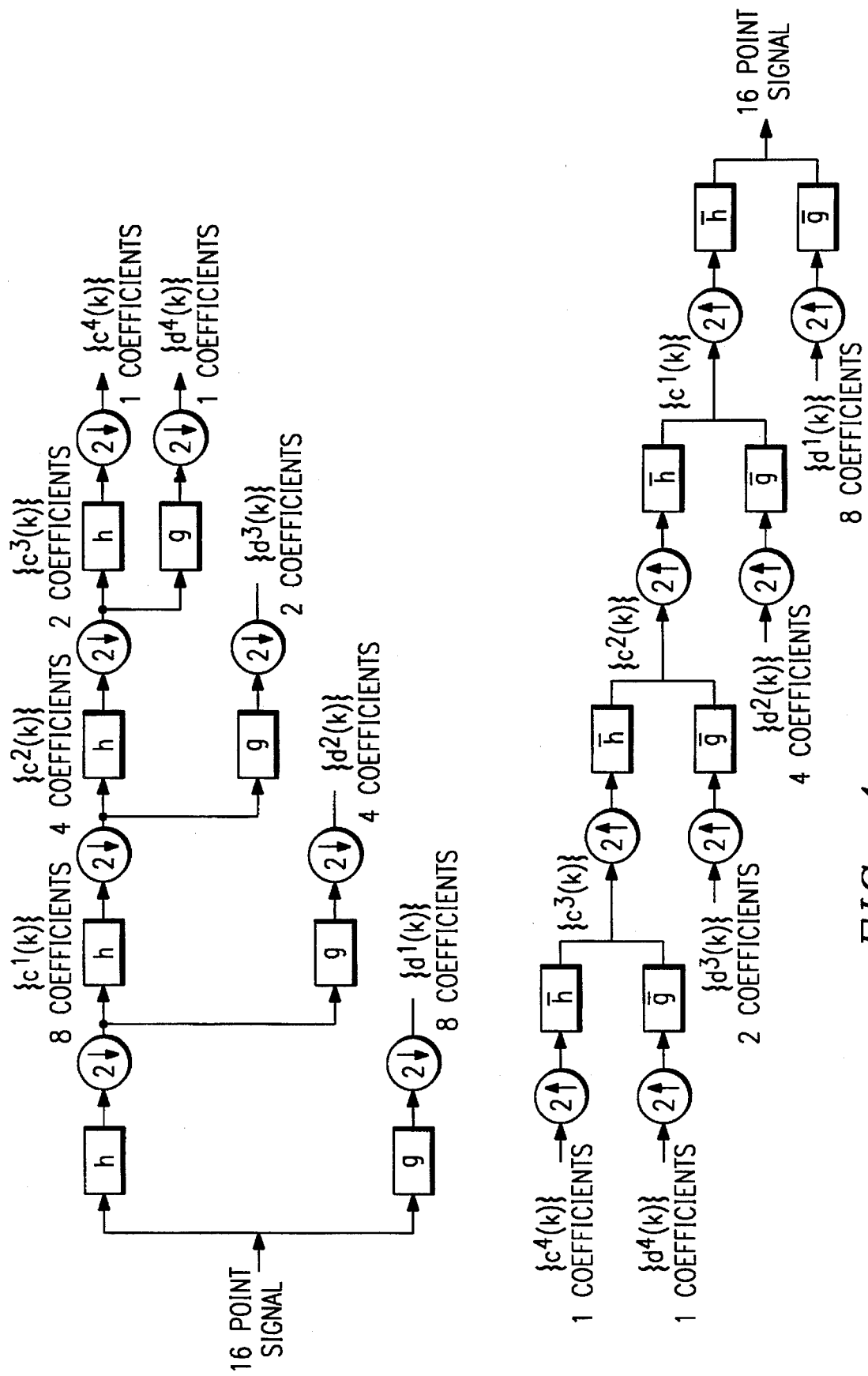
FIG. 4 is a diagram of the pyramid algorithm used by the discrete standard wavelet transform.

The preferred embodiments of the present invention and its advantages can be best understood by referring to the FIGUREs, like numerals being used for like and corresponding parts of the various drawings.

Time-Frequency Uncertainty Principle.

The present invention successively applies standard discrete wavelet mathematics using highly efficient electronic hardware to produce sets of basis coefficients, which represent the signal in varying degrees of concentration. Highly efficient hardware selects the set having the greatest degree of concentration. In order to fully understand the operation of the present embodiment, an understanding of the operation and nature of the basis coefficients produced by the SWT is required.

The operation of the SWT is best understood by contrasting it with the DFT, which is familiar to most engineers and scientists. The starting point for a description of the SWT is the uncertainty principle, which describes the relationship between a signal's time duration, $\Delta t$, and bandwidth, $\Delta \omega$, which are given by the standard deviations of the signal, $f(t)$, and its DFT, $F(\omega)$:

Let:

$$(\Delta t)^2 = \int \frac{(t-\bar{t})}{2} |f(t)|^2 dt \quad \Delta t = \text{Duration} \tag{1a}$$

and $$(\Delta \omega)^2 = \int \frac{(\omega-\bar{\omega})}{2} |F(\omega)|^2 d\omega \quad \Delta \omega = \text{Bandwidth} \tag{1b}$$

The uncertainty principle states that a signal's time duration and bandwidth must satisfy the following relationship:

$$\Delta t \cdot \Delta \omega \geq \frac{1}{2} \tag{2}$$

The uncertainty principle holds that a short signal yields a wide spectrum. That is, both the signal's duration and its bandwidth cannot simultaneously be made arbitrarily small. The uncertainty principle's importance in transform theory comes from the fact that a transform represents a signal in terms of usually orthogonal basis elements. Each of the basis elements used to represent a function covers a localized area on the time-frequency plane. The uncertainty principle specifies that the region that a basis function covers on the time-frequency plane cannot be arbitrarily small, the region must satisfy the condition of Equation (2). Thus, the time covered by the basis function is approximately $\Delta t$ and the frequency it covers is approximately $\Delta \omega$.

The uncertainty principle gives the minimum area that the basis function can cover. As shown in FIGS. 1a through 1d, if the region covered by a basis function is narrow in frequency, it must cover a large area in time. Similarly, if the region covered by a basis function is narrow in time, it must cover a large area in frequency.

FIGS. 1a through 1d are coordinate views of the time-frequency plane. Time is represented on the abscissa 20. Frequency is represented on the ordinate 22. FIG. 1a shows the subspaces 24 for basis functions that have broad frequency coverage but are narrow in time. FIGS. 1b and 1c show the subspaces, 26 and 28, for basis functions that have intermediate time-frequency tradeoffs and FIG. 1d shows the subspaces 30 for basis functions which are narrow in frequency but have broad time coverage.

Thus, inefficient basis signals are the result of the inability to use basis functions with arbitrarily high resolution in both time and frequency. Ideally, one would like to represent a signal as compactly as possible on the time-frequency plane, because signal information can easily be extracted from such a representation. However, if narrow frequency basis functions are used to represent a signal, the sharp discontinuities in the signal will be spread across many coefficients. Similarly, if a basis function that is short in time but broad in frequency is used to represent a signal, then constant frequency signals will have many basis coefficients.

As shown in FIG. 2, the DFT uses sinusoidal basis functions. These functions are narrow in frequency but broad in time, as shown by the subspaces 32. Thus the DFT effectively represents the sinusoidal components of signals, which are also narrow in frequency and broad in time, but poorly represents signal discontinuities, which are narrow in time and broad in frequency.

The SWT was developed to better represent signals with discontinuities. The SWT uses variable-width basis functions which trade resolution in time for resolution in frequency. In order to isolate discontinuities, which are isolated in time but spread over a broad frequency range, the SWT uses basis functions that are very short. To obtain fine frequency resolution for low frequencies, long basis functions are used. Through the use of its short basis functions, the SWT is better able to represent signal discontinuities. However, for signals consisting of essentially constant frequencies, the SWT will usually not produce a very concentrated time-frequency representation.

Discrete Standard Wavelet Transform.

Most signal processing, compression and numerical analysis applications involve discrete sampled signals consisting of a sequence of numbers $\{c^o(n):n=0, \ldots N-1\}$. The discrete SWT decomposes such signals into coefficients which correspond to basis functions with time-frequency characteristics shown in FIG. 3. The basis functions used in the upper half of the frequency plane (mathematical subspace $o_1$) are narrow in time and broad in frequency. For lower frequencies, the SWT uses basis functions which are longer in time and more narrow in frequency. While the concept behind the SWT is simple, a deep mathematical theory is required to implement it. FIG. 3 is an idealized drawing which depicts the regions covered by the basis functions as distinct and non-overlapping. A complex mathematical theory has been developed to derive basis functions which approach this idealized situation.

Reference is made to Daubechies, I., "Orthonormal Bases of Compactly Supported Wavelets," *Communications on Pure and Applied Mathematics*, Vol. XLI 909–996, 1988, which is here incorporated by reference (hereinafter Daubechies) which fully describes the mathematics of the discrete SWT. As shown by Daubechies, the basis coefficients for the mathematical subspaces $V_1, V_2, \ldots$ are given by the sets $\{c^1(k):k=0, \ldots, (N/2)-1\}$, $\{c^2(k):k=0, \ldots, (N/4-1)\}, \ldots$ and the basis coefficients for the mathematical subspaces $O_1, O_2, \ldots$ are given by $\{d^1(k):k=0, \ldots, (N/2)-1\}$, $\{d^2(k):k=0, \ldots, (N/4)-1\}, \ldots$ Daubechies also shows that these basis coefficients for a discrete signal $\{c^o(n):n=0, \ldots N-1\}$ are computed through two filter equations:

$$c^{j+1}(k) = n\Sigma\, h(n - 2k)c^{(n)} = n\Sigma\, h(n)c^j(2k - n) \tag{3a}$$

and $$d^{j+1}(k) = n\Sigma\, g(n - 2k)c^j(n) = n\Sigma\, g(n)c^j(2k - n) \tag{3b}$$

where the coefficients $\{d^j(k):j=1, \ldots, M=\log_2 N$ and $k=0, \ldots, \log_2(M-j)\}$ are called the wavelet coefficients and are computed by through the pyramid algorithm shown in FIG. 4 for a 16-point signal which employs filter Equations (3a) and (3b).

Physical Meaning of the Wavelet Coefficients.

In order to use the SWT, it is very important to recognize the meaning of the $\{c^j(k)\}$ and $\{d^j(k)\}$ coefficients. The $\{c^j(k)\}$ coefficients correspond to scaling basis functions $\{\phi_{jk}\}$ (hereinafter Daubechies) which represent the function in the subspaces $V_j$. The wavelet coefficients, $\{d^j(k)\}$, correspond to wavelet basis functions $\{\psi_{jk}\}$ (Daubechies) which represent the function in the subspaces $o_j$. These wavelet coefficients produce concentrated representations for signal discontinuities. For example, the coefficient $\{d^1(k)\}$ represent the signal in the subspace $o_1$. They correspond to basis functions which are broad in frequency and are, therefore, short in time. Thus they are well matched to signal discontinuities. If there are N points in the original sequence $\{c^o(k)\}$, there are N/2 members of $\{d^1(k)\}$. The basis coefficients $\{d^2(k)\}$ represent the signal in $o_2$. The corresponding basis functions are less broad in frequency and are, therefore, longer in time than the first set. There are N/4 of these coefficients. The decomposition continues for $M=\log_2 N$ resolutions (or scales). For scale M, there is only one coefficient which corresponds to a basis function which is very narrow in frequency and therefore long in time. At scale M, the coefficient $\{c^M(0)\}$ is included in the discrete SWT to represent the "DC" component.

Wavelet Filters.

Computation of the discrete wavelet coefficients is accomplished using the very simple filtering operations of equations (3a) and (3b). Although in practice the SWT filters are easy to apply, a complex mathematical theory has been developed to derive filters which yield orthonormal bases whose elements have good localization properties in both time and frequency. Daubechies has developed the "best" filters in terms of time and frequency localization. Her wavelets are smooth yet provide good time and frequency localization. They are compactly supported resulting in short filters (typically 8–12 taps) which do not have to be truncated. However, the Daubechies filters are non-symmetrical. This can lead to difficulties in reconstructing signal and image edges. If symmetrical wavelets are required, the spline wavelets developed are normally used such as those of Battle, G., "A Block Spin Construction of Ondelettes, Part I: Lemarie Functions," *Comm. Math Phys.*, 1987; Lemarie, P. G., "Ondelettes a Localisation Exponentielle," *Communications on Pure and Applied Mathematics*, Vol. XLI 909–996, 1988; and Meyer, Y. "Ondettes et Functions Splius," *Seninarie EDP, Ecole Polytechnique*, Paris, France, Dec. 1986, all of which are here incorporated by reference.

Figure 5:
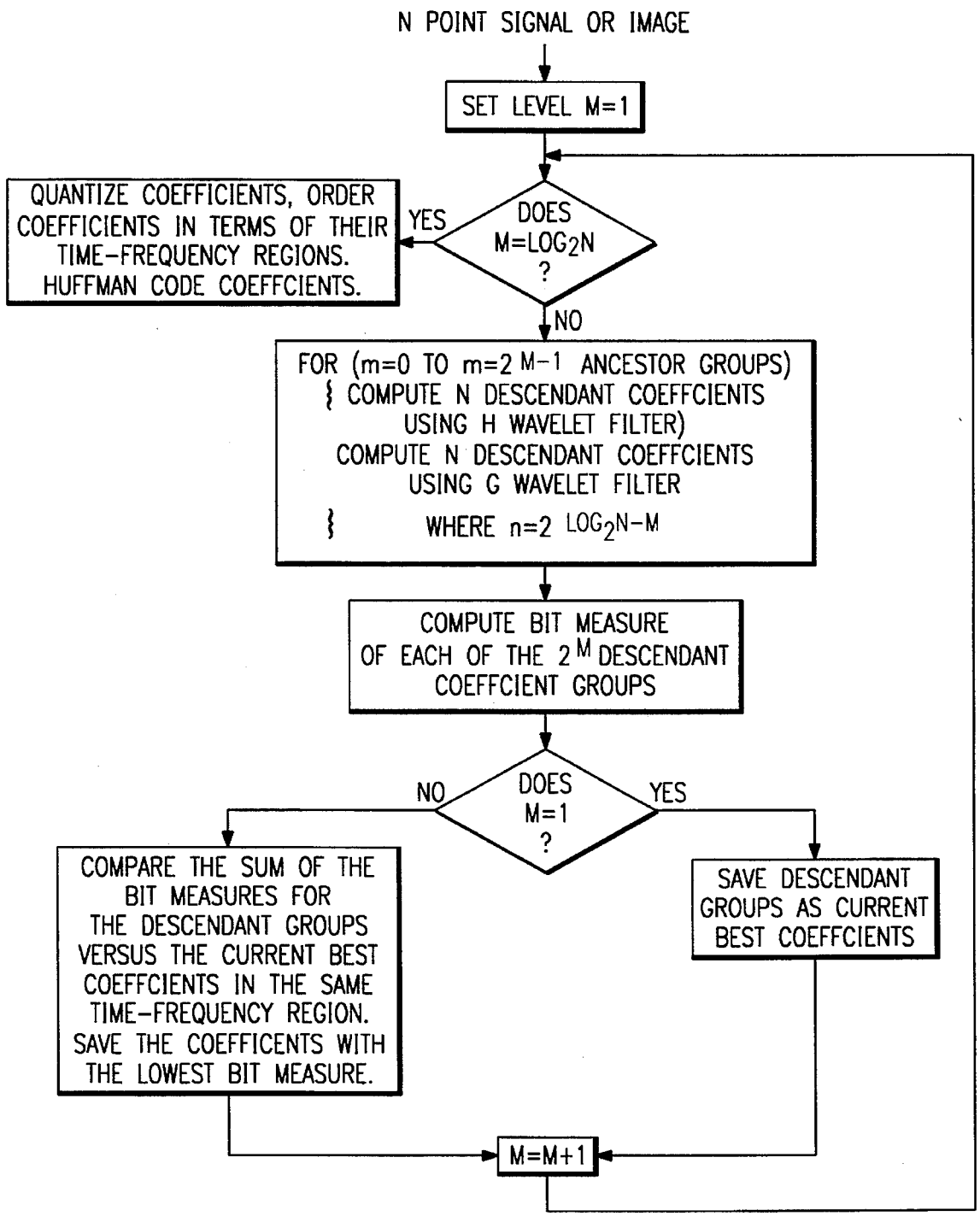
FIG. 5 is a flow chart view of the data compression system arranged according to the teachings of the present invention.

FIG. 5 is a flow chart of one embodiment of the invention. This embodiment uses successive applications of the discrete SWT to produce basis coefficients corresponding to basis functions which have gradually varying time-frequency uncertainty tradeoffs. Then it selects the basis functions which represent the signal in the most concentrated manner. Unlike the SWT, which uses short basis functions at high frequencies and long basis functions at lower frequencies, this invention has the ability to use any kind of basis function at any frequency. This gives the invention the ability to produce highly concentrated signal representations. The invention, therefore, uses the following steps:

Step 1: The first step is to compute the wavelet basis coefficients which represent the signal in each of the time-frequency regions shown in FIG. 6. This computation is performed in a highly efficient manner using successive application of the SWT. There are N $\log_2$N total coefficients computed for an N point signal.

Step 2: The next step is to select the "best basis" which represents the signal in the most concentrated manner. This "best basis" is composed of a selection of one set of N basis coefficients in FIG. 6 which completely covers the time-frequency plane. In the best basis, most of the coefficients are small so that the signal's energy is concentrated into a few large coefficients. This selection process is carried out in an efficient manner which can easily be implemented in real-time hardware.

Step 3: In this step, the coefficients are coded using a very small number of bits. The preferred embodiment achieves this result by using information regarding the time-frequency region covered by the chosen basis functions. The coefficient information is then Huffman coded.

The following discussion describes in more detail the above-stated steps.

Step 1: Computation of the Basis Coefficients.

The invention uses repeated application of the SWT to compute basis coefficients corresponding to basis functions with gradually varying time-frequency tradeoffs. Unlike the SWT, which uses basis functions in subspaces $o_1, o_2, \ldots o_M$ and $V_M$, the invention can utilize basis function in a larger variety of subspaces with varying time-frequency tradeoffs. At the top scale are functions which are narrow in time and have broad bandwidth. At the lowest scale are functions which have a narrow frequency range and cover the whole time length of the signal. At the intermediate scales are functions which have time-frequency tradeoffs which are intermediate between the two extreme scales. While the SWT must use short functions with large bandwidth at the higher frequencies and long functions with small bandwidth at the lower frequencies, the present embodiment has the ability to use basis functions with optimal time-frequency characteristics at any frequency.

Figure 7:
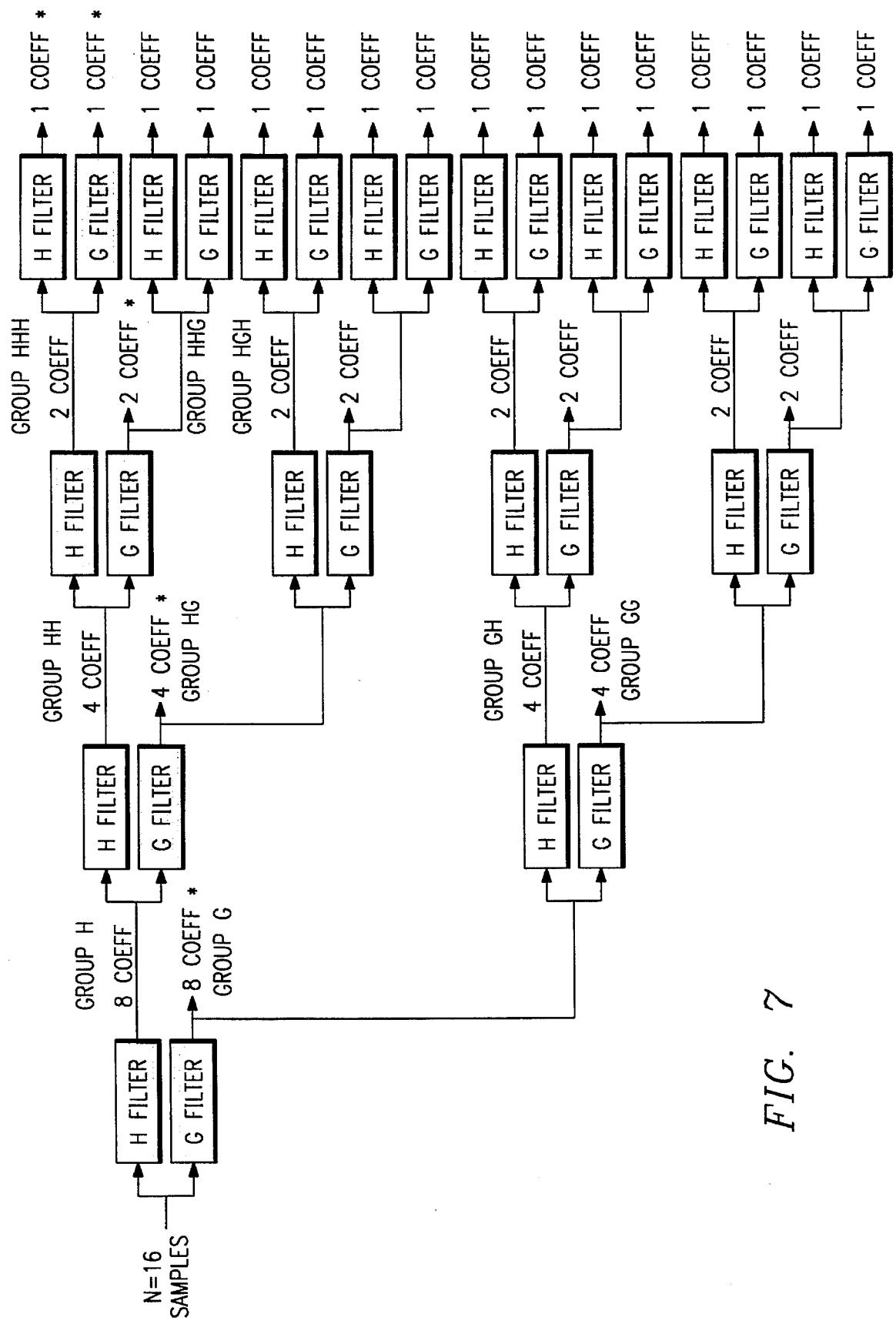
FIG. 7 is a block diagram of the wavelet filtering tree of the data compression system constructed according to the teachings of the present invention.

In FIG. 7 appears the exact procedure this invention uses to compute the basis coefficients for a 16-point signal. In the SWT, the original sequence, which corresponds to a signal lying in subspace $V_o$, is split into two orthogonal sequences corresponding to signals lying subspaces $V_1$, using the H filter 38 and $o_1$, using the G filter 40. The sequence lying in subspace $V_1$ is further split into subspaces $V_2$, using the H filter and $o_2$, using the G filter. The process continues for M=$\log_2$N scales with N being the number of points in the original sequence. The SWT consists of the coefficients corresponding to basis functions in subspaces $o_1, o_2, \ldots, o_M$ and $V_M$. These basis functions employed by the SWT produce concentrated representations for signals with discontinuities but not for most sinusoidal signals.

Take, for example, a sinusoidal signal with a frequency equal to $3 \cdot f_{max}/4$. Application of the SWT results in the signal's energy being spread across all basis coefficients corresponding to basis functions in $o_1$. Since there are N/2 of these coefficients, the compression capabilities of the discrete SWT for this sinusoidal signal are poor.

The invention produces concentrated time-frequency representations by choosing basis functions that are well matched to the signal's time-frequency characteristics. It chooses one set of basis functions from a large number of possible sets which are produced using the H filter and G filter through the decomposition procedure illustrated in FIG. 7. The time-frequency characteristics of the coefficients resulting from this decomposition are determined by examining the resulting signals in the frequency domain.

Figure 8A:
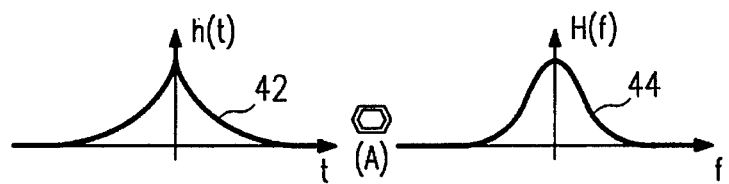
FIGS. 8a–8g are views of the frequency spectrum showing the concepts behind the discrete fourier transform.
Figure 8B:
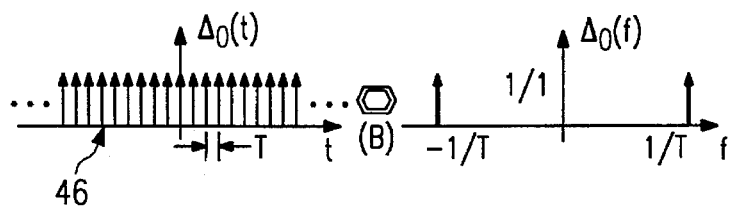
Figure 8C:
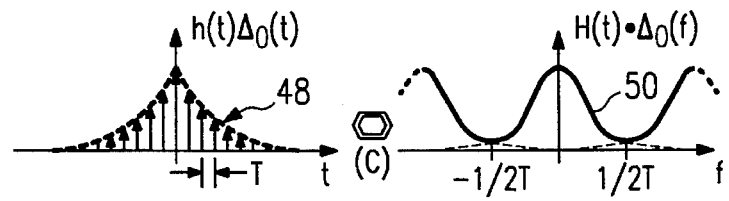
Figure 8D:
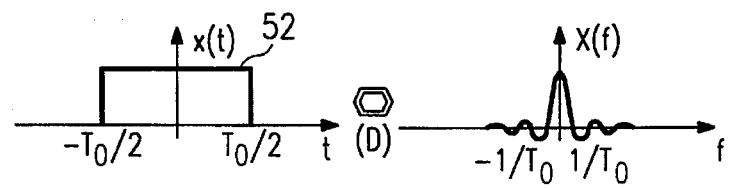
Figure 8E:
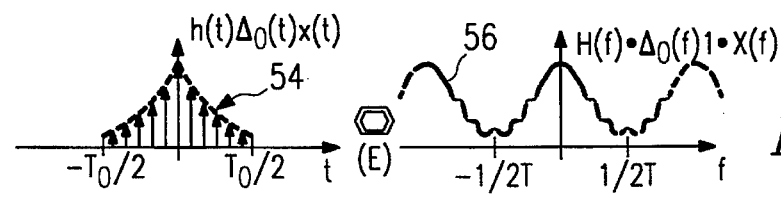
Figure 8F:
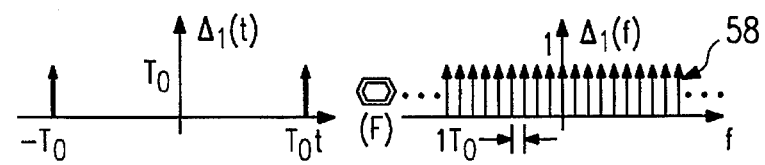
Figure 8G:
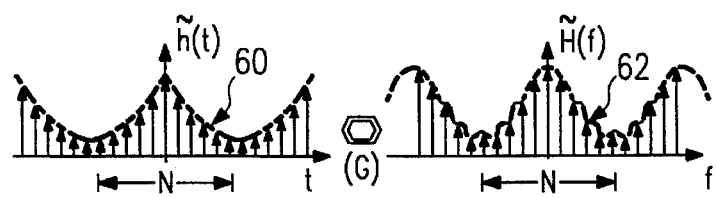

The original time signal 42 and its DFT 62 are illustrated in FIG. 8a. Time signal 42 is sampled by multiplying it by the impulse train 46 shown in FIG. 8b, resulting in the discrete time signal 48 and Fourier spectrum 50 of FIG. 8c. The Fourier Transform of the product of two time functions is obtained by convolving their individual Fourier Transform. The discrete time signal 48 is truncated to N points by multiplying the signal by the window 52 shown in FIG. 8d. The resulting time signal 54 and its associated frequency spectrum 56 are illustrated in FIG. 8e. Finally, the Fourier Transform 56 of FIG. 8e is sampled by pulse train 58 and truncated to N points resulting in the discrete time signal 60 and its associated DFT 62 in FIG. 8g. Note that both discrete time signal 60 and its DFT 62 are periodic. The maximum frequency that does not result in aliasing is given by $f_{max}=\frac{1}{2}T$ in which T is the sampling period. This frequency is the so-called Nyquist frequency. Thus, the maximum radian frequency is given by $\omega_{max}=2\pi f_{max}=\pi/T$.

Figure 9A:
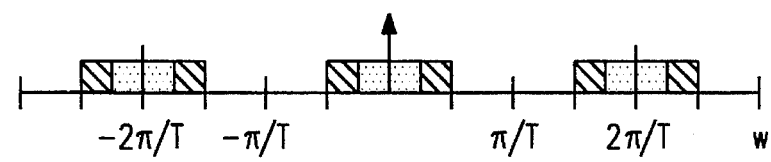
FIGS. 9a–9d are views of the frequency spectrum showing the effects of filtering a signal using the H filter and downsampling.
Figure 10A:
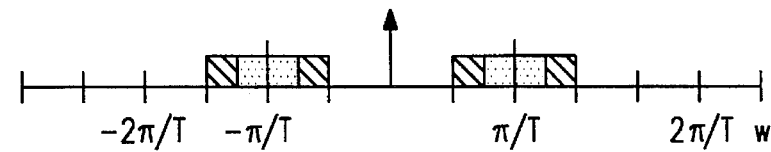
FIGS. 10a–10d are views of the frequency spectrum showing the effects of filtering a signal using the G filter and downsampling.

As described above, wavelet H filter 38 is a low-pass half-band filter that approximately extracts the lower half of the frequency spectrum ($o\text{-}\omega_{max}/2$), and wavelet G filter 40 is a high-pass half-band filter that approximately extracts the upper half of the frequency spectrum ($\omega_{max}/2\text{-}\omega_{max}$). The actual situation is slightly more complex. The outputs of G filter 38 and H filter 40 are signals that are mathematically orthogonal to each other and lie approximately in the lower-half and upper-half frequency bands. FIG. 9a shows the frequency spectrum of the H-filtered signal, FIG. 10a shows the frequency and spectrum of the G-filtered signal. Each of these signals is downsampled by two. Every other sample from each signal is eliminated. Thus, if the original signal has N points, the low-pass and high-pass signals each have N/2 points.

If the original signal's DFT is given by $\{X(m\pi/NT): m=0, 1, \ldots, N-1\}$, then the DFT of the downsampled signal is given by:

$$Y\left[\frac{m\pi}{NT}\right] = \frac{1}{2}\left[X\left[\frac{m\pi}{2NT}\right] + X\left[\frac{m\pi}{2NT} + \frac{\pi}{T}\right]\right] \quad (4)$$

Figure 9B:
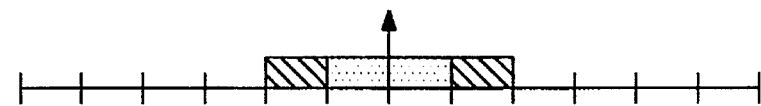
Figure 9C:
Figure 9D:
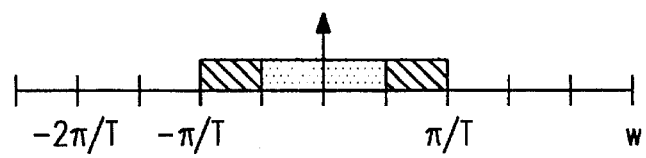
Figure 10B:
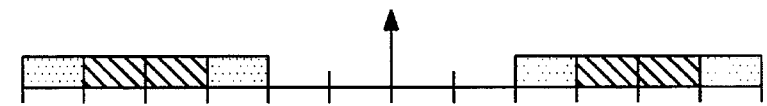
Figure 10C:
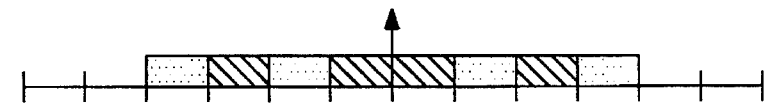
Figure 10D:
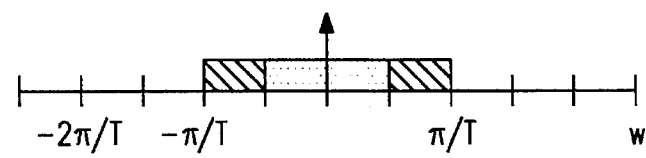
Figures 11A, 11B, 11C, 11D:
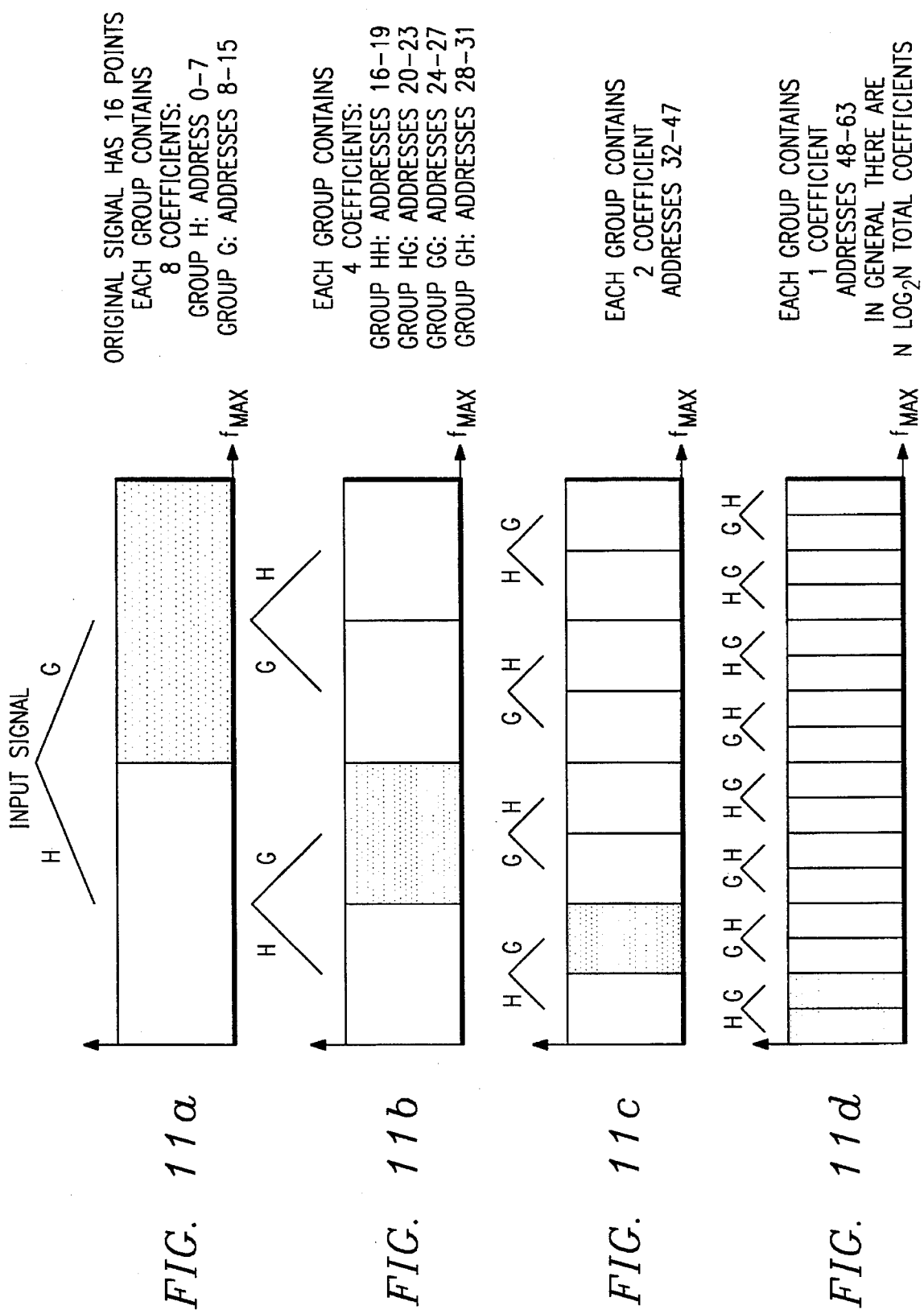
FIG. 11a–11d is a listing of the addresses assigned to coefficients as a function of their frequency subspace.

When this equation is applied to the DFT's of the H filtered and G filtered signals, their frequency spectrums are stretched. The effect of downsampling the H filtered signal is illustrated in FIGS. 9b and 9c, and FIGS. 10b and 10c for the G-filtered signal. FIGS. 9b and 10b show the first term of Equation (4) and FIGS. 9c and 10c show the second term of Equation (4). For the H-filtered signal, the first term in Equation (4) causes the frequency spectrum to stretch to cover the entire range between o and $\omega_{max}$. The second term has no effect because it lies outside of the range 0 to $\omega_{max}$. For the G-filtered signal, the second term in Equation (4)

causes the frequency spectrum to stretch to cover the entire range between o and $\omega_{max}$, while the first term has no effect because it lies outside of the range o to $\omega_{max}$. But it is important to note that the frequency-order of the coefficients is flipped for the G-filtered signal. The higher frequency coefficients end up in the lower part of the frequency spectrum and the lower frequency coefficients end up in the upper end of the frequency spectrum. It is important to understand this effect because the downsampled signals are subsequently operated on by H filters 38 and G filters 40 in the next level of processing. For the H filtered signal, further processing results in two additional signals whose original frequencies lie in the ranges of o–$\omega_{max}/4$ and $\omega_{max}/4$ to $\omega_{max}/2$. But, when the G filtered signal is further processed by H filter 64 and G filter 66, the resulting coefficients are reversed in their frequency order. The output of H filter 64 is coefficients whose original frequencies lie in the range between $3\omega_{max}/4$–$\omega_{max}$ and the output of G filter 66 is coefficients whose original frequencies lie in the range between $\omega_{max}/2$ and $3\omega_{max}/4$.

The results of the successive filtering operation are basis coefficients corresponding to basis functions that lie on a graduated scale of time-frequency tradeoffs. At the top scale are functions that are narrow in time and have a broad bandwidth. At the lowest scale are functions that have a narrow frequency range and cover the whole time length of the signal. At the intermediate scales are functions having time-frequency tradeoffs between the two extreme scales. Note that unlike the discrete SWT, each "type" of basis function is available at every frequency. While the SWT must use short functions with large bandwidths at the higher frequencies, and long functions with small bandwidths at the lower frequencies, this invention has the ability to use basis functions with the "optimal" time-frequency characteristics at any frequency.

Step 2: Choosing the Most Concentrated Basis.

Since there are a large number of basis coefficients from which to choose (for example there are 8192×13=106,586 possible basis functions for a 8192 point signal), this invention uses a fast selection method which can operate in real-time. Once the invention has computed the coefficients in Group H, Group G, Group HG, Group HH, Group GH and Group GG, it compares the bit measure (defined below) of Group H versus the sum of the bit measures of Group HH and Group HG. Since the wavelet filters are energy preserving, the signal energy in Group H is equal to the sum of the energies in Groups HH and HG. Thus the sum of bit measures of Groups HG and HH is compared to the measure of Group H. The invention retains the group(s) with the lowest bit measure as the current "best" group.

The bit measure for a group of coefficients is simply the number of bits needed to code the coefficients in that group. For the jth group, which consists of coefficients $\{c^j(k); k=0, \ldots, K\}$, the bit measure, $BM_j$, is given by:

$$BM_j = \sum_{k=0}^{K-1} \log_2(1 + c^j(k)) \tag{5}$$

For groups of unconcentrated coefficients, the bit measure is high because most of the coefficient are fairly large. For concentrated groups of coefficients, there are typically a few large coefficients and a large number of small coefficients which makes the bit measure low. This method is successively applied between the current best set of coefficients and the next set of computed coefficients that cover the same area on the time-frequency plane. The resulting choice of coefficients is the set which represents the signal in the most concentrated manner in that region of time-frequency.

Step 3: Efficient Coding of Basis Coefficient Information for Data Compression.

In order to be of utility for data compression, is not sufficient that the invention merely represents a signal or image using few basis coefficient. Information regarding which of the coefficients are used must also be coded very concisely. For example, for a 8192 point signal, there are 106,586 potential coefficients which can be used. If along with the coefficient magnitude, an "address" which identified which of the 106,586 coefficients was used were transmitted, much of the advantage of producing an efficient signal representation would be lost because it would take a 17-bit address for each coefficient. For most signals, the invention can usually faithfully represent the signal using coefficients totaling approximately 10% of the original points (for example, for a 8192 point signal, about 410 coefficients are needed). The coefficients can be coded with about 4 -bits/coefficient resulting in data compression of only about 4:1 (819×(4+17)(8192×8)) if straightforward address coding is used.

A technical advantage of the present invention is the reduction of the number of bits required to inform the decompressor of the coefficients being used. The invention vastly reduces the number of bits required to inform the decompressor of which coefficients are being used. The present embodiment does this by taking advantage of the fact that the use of one coefficient eliminates the possibility of using many other coefficients. The coefficients are assigned addresses which run from the top left to the bottom right, as shown in FIGS. 11a–11d. After the best basis coefficients are selected, they are ranked in decreasing order of magnitude and then quantized. After quantization, many coefficients have the same value, and all of the coefficients are reordered in increasing order of their addresses. Typically, this results in "clusters" of coefficients which have similar addresses and the same quantized value. The absolute address of the first coefficient is stored. Then, all coefficient addresses which can be eliminated because they correspond to basis coefficients which overlap the first coefficient in time and/or frequency are marked as such. Then, the difference between the magnitude of the first coefficient and the magnitude of the second coefficient is computed as well as the difference between their addresses, excluding the coefficients which have been eliminated. Inclusion of the second coefficient may eliminate the possibility of using other coefficients and, if so, those are also eliminated. This procedure continues for all the coefficients, resulting in a large number of zeroes, ones, and other small numbers. The magnitudes and the addresses are separately entropy-coded using Huffman or Arithmetic coding. Using this method, both magnitude and address information can typically be encoded with about 6 bits per coefficient.

Fast Hardware to Compute Basis Coefficients.

Figure 6:
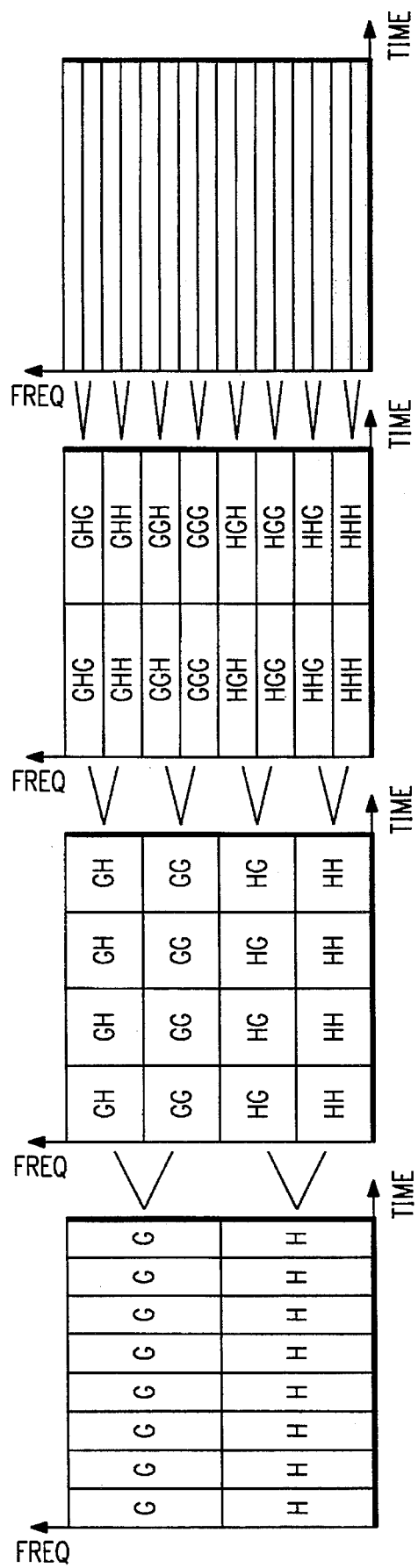
FIG. 6 is a coordinate view of the time-frequency plane showing the regions covered by the basis coefficients employed in the present invention.

A technical advantage of the present invention as compared to standard transforms is the ability to use "optimal" basis functions in each time-frequency region. However, the number of computations required in the additional filter operations shown in FIG. 6 are significantly higher than the number of computations required by traditional transforms.

A further technical advantage of the invention is to provide hardware that can rapidly perform the wavelet filtering operation with an integrated circuit which as the following attributes:

A single integrated circuit (IC) is used for decomposition (compression) and reconstruction (decompression). Two single-bit control signals are used to configure the processor for wavelet decomposition or reconstruction. In the decomposition mode, the low-pass and high-pass filter outputs are subsampled and multiplexed so that they appear on alternating clock cycle on the output. For the reconstruction mode, the low-pass and high-pass inputs are presented to the integrated circuit on alternating clock cycles and this data stream is automatically demultiplexed and upsampled.

To achieve high-speed operation, no multipliers are used to implement the wavelet filters. Multiplier-free operation is achieved through the use of parallel-distributed arithmetic and ROM storage of filter coefficient combinations. A pipelined parallel adder unit is used to ensure a critical-path delay less than that of two full adders.

Figure 12:
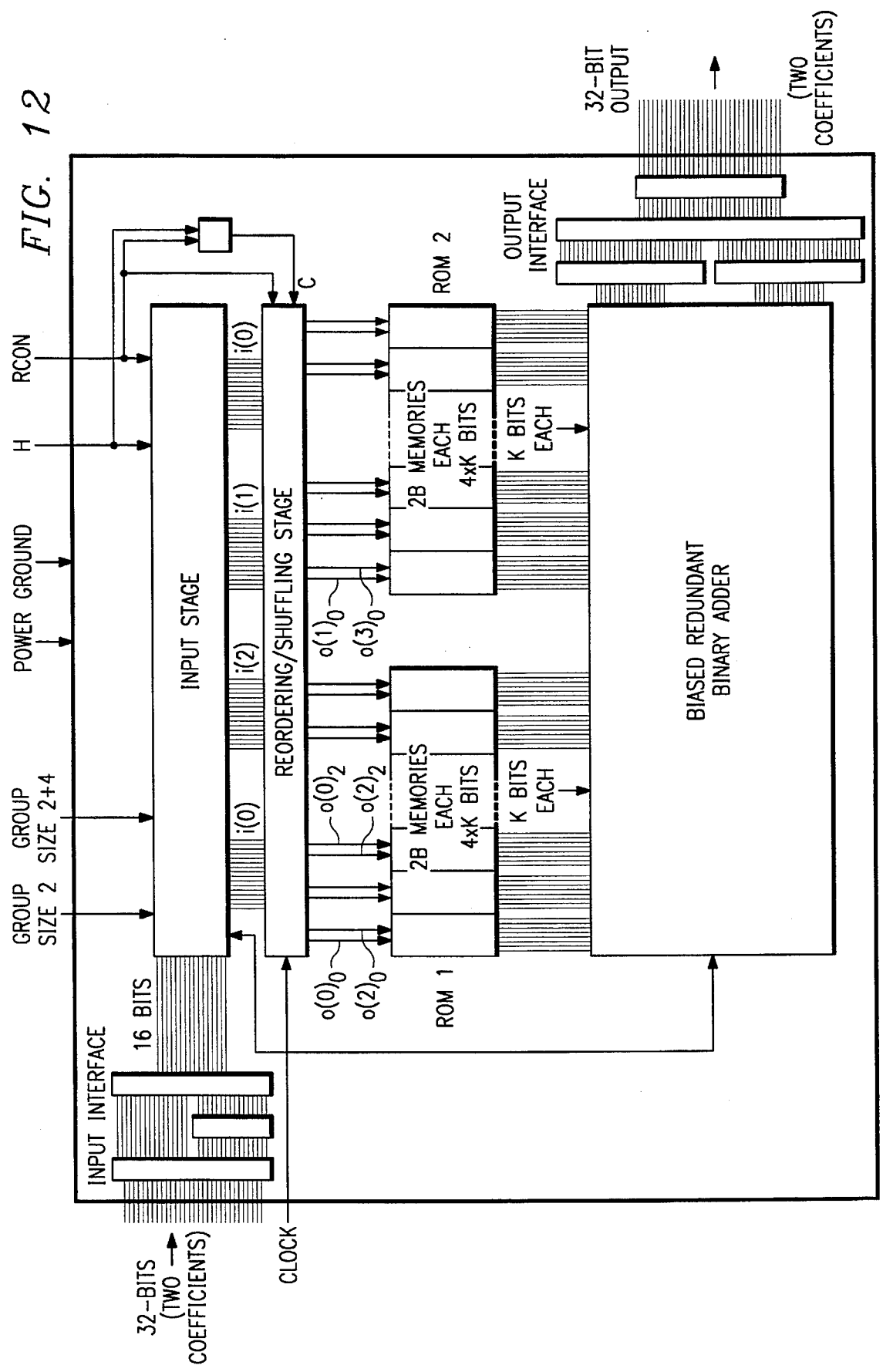
FIG. 12 is a block diagram of the filter integrated circuit hardware.

The input stage is configured so that it can load wavelet coefficients in a serial or parallel manner so that at all scales, very few clock cycles are wasted. The integrated circuit consists of six major sections as shown in FIG. 12: 1) the input interface, 2) the input stage, 3) the reordering/shuffling stage, 4) the ROM memory, 5) the adder and 6) the output interface. The integrated circuit is described for 16-bit data samples but this description is not meant to construe that other data word lengths can not be utilized.

FIG. 4 depicts the two-band decomposition/reconstruction wavelet filter bank which is used as a building block in the Standard or Adaptive Wavelet Transform. To simplify the description of the hardware, a wavelet filter with length L=4 is considered. The design is easily modified to implement higher order wavelet-based filters. From Daubechies it is seen that given the impulse response of the wavelet-based low-pass decomposition filter {h(0), h(1), h(2), h(3)}, the corresponding high-pass decomposition filter, the low-pass reconstruction filter and high-pass reconstruction filter coefficients are obtained by:

h(n) Low Pass Decomposition: {h(0), h(1), h(2), h(3)}
g(n) High-Pass Decomposition: {h(3), h(2), h(1), −h(0)}
h(−n) Low-Pass Reconstruction: {h(3), h(2), h(1), h(0)}
g(−n) High-Pass Reconstruction: {h(0), h(1), −h(2), h(3)}

Since all four impulse responses are related, the integrated circuit stores only the filter coefficients for low-pass decomposition.

The integrated circuit uses parallel distributed arithmetic to efficiently implement the linear filtering operation of the SWT in hardware. To express the linear filtering operation using distributed arithmetic, first note that a wavelet coefficient $c^j(2k-i)$ scaled such that $-1 \geq c^j(2k-i) \leq 1$ in Equation (3a) can be rewritten as:

$$c^{j+1}(k) = \sum_{i=0}^{L-1} h(i) c^j(2k-i), \quad (6a)$$

where $$c^j(2k-i) = \sum_{b=0}^{B-1} c_b^j(2k-i) 2^{-b}, \quad (6b)$$

where L is the size of the wavelet filter (i.e., 4 in this example) and B is the number of bits in the input word (i.e, 16 in this description). The right-hand equation represents $c^j(2k-i)$ in fixed-bit format. For numbers in two's complement form, $c_b^j(2k-i)$ is either 0 or 1 for b=1,2,3, . . . , B-1 and $c_o^j(2k-i)$ is either 0 or −1. Substituting the right-hand equation into the left-hand equation and reordering gives:

$$c^{(j+1)}(k) = \sum_{b=0}^{B-1} \left\{ \sum_{i=0}^{L-1} h(i) c_b^j(2k-i) \right\} 2^{-b} \quad (7)$$

The parallel distributed arithmetic used in this invention very efficiently implements this linear convolution operation in hardware by computing the inner sum using a ROM look-up table and computing the outer sum using a parallel adder. Combinations of h(0), h(1), h(2), and h(3) are stored in ROMs addressed by an input shift register stage. The clocking of the input shift register stage is such that subsampling is performed during decomposition and upsampling is performed during reconstruction. The outer summation operation and shift operations (expressed as $2^{-b}$) in Equation (7) are performed in parallel by a Biased Redundant Adder (BRBA) Stage. Control hardware is used to select, at the beginning of operation, between the decomposition and reconstruction modes based on the value of a control bit: Rcon. During each cycle, another control bit, H, selects between low-pass and high-pass operations.

Input Interface.

The purpose of the input interface is to read two successive data samples in a 32-bit double word in which the first data sample is in the lower 16 bits and the second data sample is in the upper 16 bits. The storage of data in 32-bit double words enables inexpensive, moderate-speed memory with 40 nsec access time to be used rather than 20 nsec memory, which would be required if 16-bit input words were used. The input interface consists of a 32-bit D register, a 16-bit D register and a 16-bit multiplexer which are clocked to present the data to the input register stage in the proper order.

Input Shift Register Stage.

Figure 13:
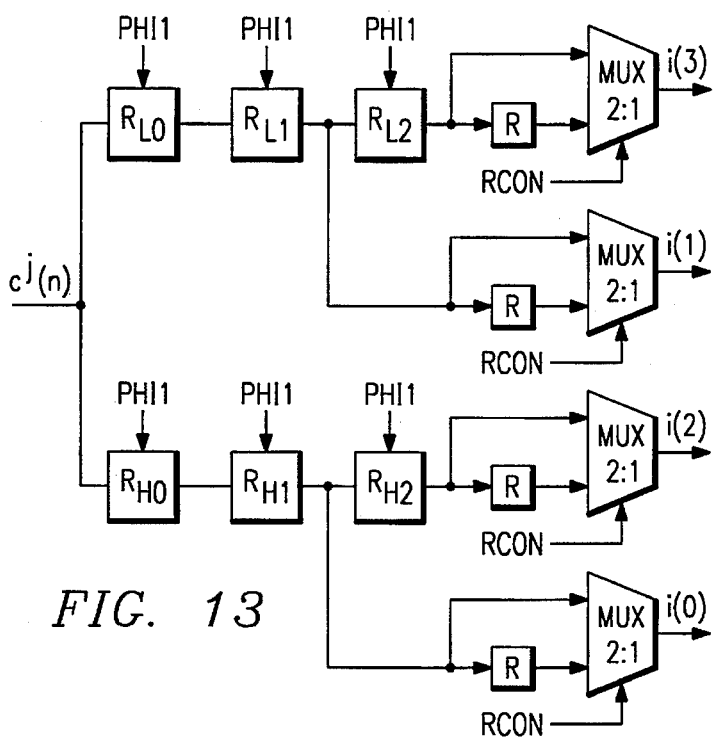
FIG. 13 is a block diagram of the filter integrated circuit input register stage.

The input register stage shown in FIG. 13 consists of six B-bit input registers ($R_{LO}$, $R_{L1}$, $R_{L2}R_{HO}$, $R_{H1}$, $R_{H2}$), four delay registers (labeled as R), and four 2:1 MUXs. An Nth order filter will have N+2 input registers, N delay registers and N 2:1 MUXs. Each register is controlled by a non-overlapping two-phase clock: phi1 and phi2. All of the input registers have a phi1 clock which is qualified by H, except for $R_{HO}$ which is qualified by H. With qualified phi1 clocks, data cannot enter the register unless both phi1 and the qualifying signal are set to logical one. The delay registers are clocked independent of H.

Decomposition Mode.

In this mode Rcon is set to 0 and control signal H changes its assertion every clock cycle so that data stored in the input registers is available for two complete cycles to perform low-pass and high-pass filtering. When H=β, an input sample $c^j(k)$ is clocked into $R_{LO}$, and the contents of all input registers shift to the right. If H=1, $c^j(k)$ is clocked into $R_{HO}$, and the contents of all other input registers are held until the next cycle. Data is not sent to the delay registers in this mode.

Chip outputs in the decomposition mode consist of multiplexed subsampled low-pass and high-pass samples. Specifically, output samples 0,2,4,6, . . . will comprise the low-pass result, $\{c^{j+1}(k)\}$, subsampled by two, while samples 1,3,5,7, ... will comprise the high-pass result, $\{d^{j+1}(k)\}$, subsampled by two. The outputs, $c^{j+1}(3)$ and $d^{j+1}(3)$, after six data samples have been clocked in, are given by $$c^{j+1}(3) = h(0)c^j(6) + h(1)c^j(5) + h(2)c^j(4) + h(3)c^j(3) \qquad (8a)$$

$$\begin{aligned}d^{j+1}(3) &= g(0)c^j(6) + g(1)c^j(5) + g(2)c^j(4) + g(3)c^j(3) \\ &= h(3)c^j(6) - h(2)c^j(5) + h(1)c^j(4) - h(0)c^j(3)\end{aligned} \qquad (8b)$$

Reconstruction Mode.

In the reconstruction mode Rcon=1. The input consists of multiplexed low-pass and high-pass data generated by the forward transform (decomposition filter). Since the initial sample will be a low-pass data sample, registers $R_{L0}$, $R_{L1}$, and $R_{L2}$ will contain low-pass data while registers $R_{H0}$, $R_{H1}$, and $R_{H2}$ will contain high-pass data. The register clocking scheme is such that the required upsampling of the low-pass and high-pass data is accomplished automatically. Data undergoes a delay of one cycle before entering the reordering/shuffling stage in the reconstruction mode to ensure proper ordering of the output samples. Since Rcon=1, registers $R_{L2}$ and $R_{H2}$ send their contents to the delay registers. The values for $c^j(6)$ and $c^j(7)$ are given by:

$$c^j(6) = c^{j+1}(3) \, h(0) + c^{j+1}(2) \, h(2) + d^{j+1}(3) \, g(0) + d^{j+1}(2) \, g(2) \qquad (9a)$$

$$c^j(7) = c^{j+1}(3) \, h(1) + c^{j+1}(2) \, h(3) + d^{j+1}(3) \, g(1) + d^{j+1}(2) \, g(3) \qquad (9b)$$

The outputs of the Input Register Stage are four 16-bit words i(0), i(1), i(2), and i(3) which correspond to the four 16-bit input data samples needed to compute the current filter output. However, since these data samples multiply different filter coefficients in the four cases of decomposition and reconstruction, a reordering/shuffling stage is required.

Reordering/Shuffling Stage.

The purpose of the reordering/shuffling stage is to reorder the data words i(0)–i(3) so that they properly address the read-only memories in each of the different modes of operation: low-pass decomposition, high-pass decomposition, low-pass reconstruction and high-pass reconstruction. The reordering/shuffling stage consists of two substages: controlled reverse ordering and controlled shuffling. The controlled reverse ordering circuit reorders the input samples i(0)–i(3) into new data samples a(0)–a(3) during high-pass decomposition and low-pass reconstruction and leaves them the same during low-pass decomposition and high-pass reconstruction. During decomposition, signals a(1) and a(3) must be further interchanged so that the ROMs are addressed with the correct input samples. The data words o(0)–o(3) (which are each 16-bits wide) are used to address the ROM memory.

ROM Memory Stage.

Figure 14:
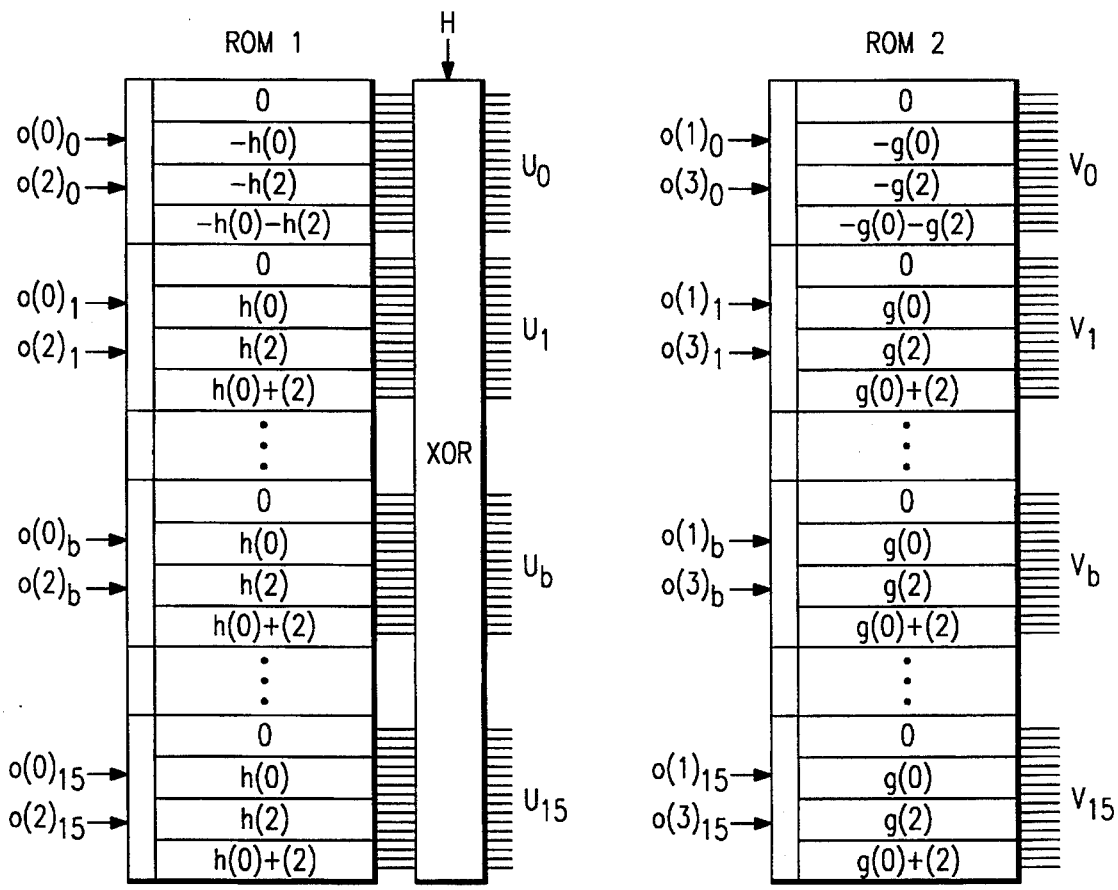
FIG. 14 is a diagram of the filter integrated circuit ROM stage.

The ROM memory stage, shown in FIGS. 14a and 14b, consists of 2B, 4×k ROMs, where B is the input register size and k is the memory word length in bits. The memory is divided between two ROMs. The B "ROM 1" memories contain four words; 0, h(0), h(2), and h(0)+h(2). Each coefficient and sum of coefficients stored in ROM is reduced in precision to k bits. Similarly, the B "ROM 2" memories hold 0, h(1), h(3), and h(1) + h(3). The reason that the filter coefficient sums are divided between two ROM banks is that the outputs of "ROM 1" must be negated whenever high-pass filtering is performed whereas the contents of "ROM 2" do not need to be negated.

The ROM memory implements the inner summation of Equation (7). The purpose of the Reorder/Shuffling Stage is to cause the following:

1) the input sample which multiples the h(0) coefficient is output on o(0), 2) the input sample which multiples the h(1) coefficient is output on o(1), 3) the input sample which multiples the h(2) coefficient is output on o(2), 4) the input sample which multiples the h(3) coefficient is output on o(3), ROM 1 memories are addressed by bits $o(0)_b$ and $o(2)_b$, (b= 0, 1, ..., B-1) and the output of the bth memory, $U_b$, is, thus, $$o(0)_b h(0) + o(2)_b h(2) \qquad (10)$$

"ROM 2" memories are addressed by bits $o(1)_b$ and $o(3)_b$, (b=0,1, ..., B-1) and the output of the bth memory, $V_b$, is thus $$o(1)_b h(1) + o(3)_b h(3) \qquad (11)$$

The pair of ROMs corresponding to the sign bit (bit 0) contains the two's complement of the values listed above. This means that for i=0, ROM 1 contains 0, -h(0), -h(2), and -(h(0)+h(2)), and ROM 2 contains 0, -h(1), -h(3), and -h(1)+(3)).

Parallel Adder Stage.

As a final step, the memory outputs $U_b$ and $V_b$ (b= 0, 1, ..., B-1) must be summed to give the filter output. The memory outputs are summed in the parallel adder stage. Since coefficients h(0) and h(2) must be negated whenever high-pass filtering is desired, the ROM 1 outputs are XOR-ed with control bit H before they are sent to the adder stage. This causes them to be inverted whenever H is a logical one. Control bit H is also sent to the adder stage as a carry-in to complete the two's complement.

Figure 15:
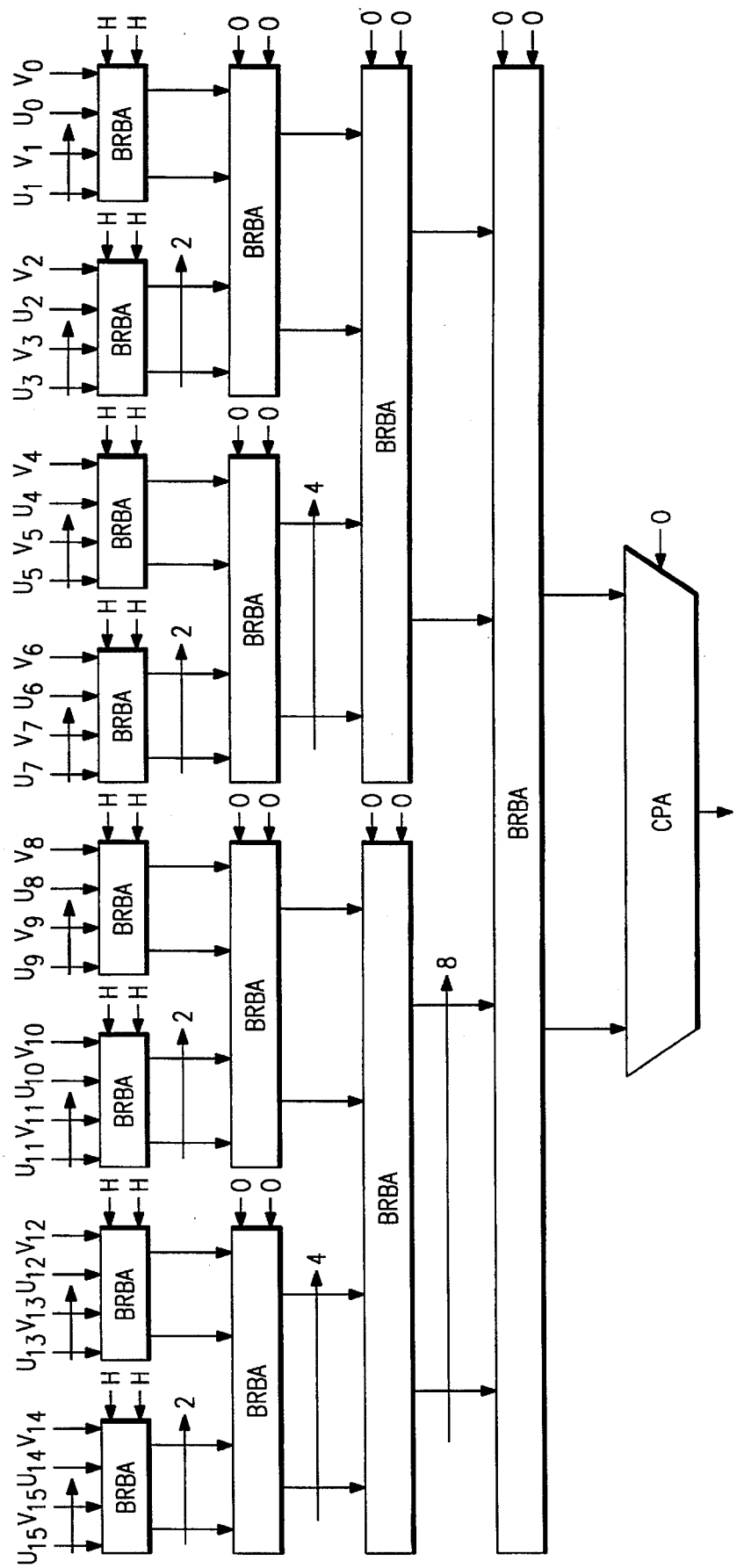
FIG. 15 is a block diagram of the filter integrated circuit adder stage.

The parallel addition of the memory outputs is accomplished through the use of pipelined stages of biased redundant binary adders (BRBAs) so that the maximum delay is less than that of two full adders. The BRBA configuration is dependent on the filter input wordlength. FIG. 15 shows an example BRBA configuration for a process or with B=16 bit input words. As shown in FIG. 15, the left pair of inputs to each BRBA is shifted right a specified number of bits relative to the right pair to achieve the shifting operation in Equation (7). To accomplish this without any loss of precision, the BRBA size must increase by the number of bits shifted.

To avoid having to perform sign extensions within the BRBA stage, a special algorithm is applied to the memory outputs. For the memory outputs corresponding to the least significant bit of the filter input, the sign is extended one bit and inverted. For all other memory outputs, the sign bit is simply inverted. Normally in the case of the memory outputs corresponding to the most significant bit of the filter input (the sign bit), all bits except the sign bit would be inverted followed by an addition of one. However, this is unnecessary for the present embodiment, since the values stored in the memories for the most significant bit are already negated.

Output Interface Stage.

This stage takes the outputs of the parallel added stage and arranges them so that they can be written into memory for storage. During decomposition, the 16-bit low-pass and high-pass outputs appear at the output of the adder multiplexed in time. However, they are stored in 32-bit wide memory where the lower 16-bit word contains the first coefficient in time and the upper 16-bit word contains the second coefficient. It is desirable to store two consecutive low-pass outputs (as well as high-pass outputs) in one 32-bit location so that they can be easily accessed for the next level of processing. Therefore, the output stage contains latches and multiplexers which accomplish this rearrangement of coefficients.

Input Stage Enhancement.

The input shift register stage with serial loading architecture shown in FIG. 13 is very efficient for computation of coefficients at the top scales of the invention, but is not very efficient for computation of the coefficients at the lower scales. For example, suppose the wavelet filter has N=12 taps. For computation of the basis coefficients at the scale where the number of coefficients are reduced from 32 to 16, the following situation occurs:

$$c^{j+1}(0) = h(0)\, c^j(11) + h(1)\, c^j(10) + \ldots + h(11)\, c^j(0) \quad (12a)$$

$$d^{j+1}(0) = g(0)\, c^j(11) + g(1)\, c^j(10) + \ldots + g(11)\, c^j(0) \quad (12b)$$

$$c^{j+1}(1) = h(0)\, c^j(12) + h(1)\, c^j(11) + \ldots + h(11)\, c^j(1) \quad (12c)$$

$$d^{j+1}(1) = g(0)\, c^j(12) + g(1)\, c^j(11) + \ldots + g(11)\, c^j(1) \quad (12d)$$

.
.
.

$$c^{j+1}(15) = h(0)\, c^j(31) + h(1)\, c^j(30) + \ldots + h(11)\, c^j(15) \quad (12e)$$

$$d^{j+1}(15) = g(0)\, c^j(31) + g(1)\, c^j(30) + \ldots + g(11)\, c^j(15) \quad (12f)$$

Note that $c^{j+1}$ and $d^{j+1}$ are computed with circular convolution (assuming non-symmetric wavelet filters). At this scale, it takes 12 clock cycles to fill up the pipeline. Once the pipeline is filled, however, the 16 outputs are computed in the next 16 clock cycles.

However, the serial loading architecture is very inefficient when coefficients at the lower scales are computed. The worst case is at the last scale where the following situation occurs:

$$c^{j+1}(0) = h(0)\, c^j(1) + h(1)\, c^j(0) + h(2)\, c^j(1) + h(3)\, c^j(0) + \ldots + h(11)\, c^j(0) \quad (13)$$

$$d^{j+1}(0) = g(0)\, c^j(1) + g(1)\, c^j(0) + g(2)\, c^j(1) + g(3)\, c^j(0) + \ldots + g(11)\, c^j(0)$$

Figure 16:
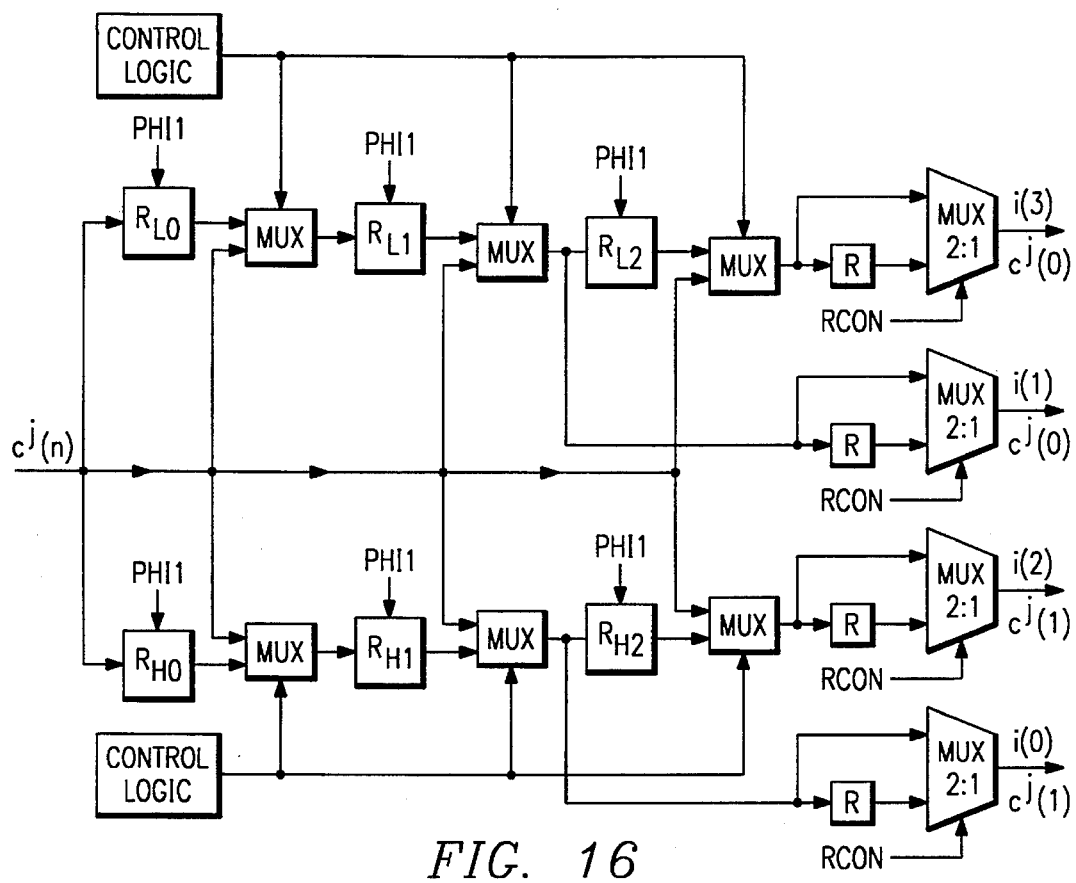
FIG. 16 is a diagram of the input register stage with multiplexer enhancement to enable parallel loading of coefficients.

If serial loading is used, the circuit must wait 12 clock cycles for the pipeline to fill up, after which it produces just one output. Then, for the next group the integrated circuit must again wait 12 clock cycles for the pipeline to fill up to produce just one output. Therefore, the integrated contains additional parallel loading architecture in the Input Stage that FIG. 16 shows.

At the lowest scale, the Input Stage is loaded with:

$$c^j(1)\ c^j(0)\ c^j(1)\ c^j(0)\ \ldots\ c^j(1)\ c^j(0)\ c^j(1)\ c^j(0) \quad (14)$$

in two clock cycles and the low-pass and high-pass outputs are produced in the next two clock cycles. For the next lowest scale, the Input Stage is loaded with:

$$c^j(3)\ c^j(2)\ c^j(1)\ c^j(0)\ \ldots\ c^j(3)\ c^j(s)\ c^j(1)\ c^j(0) \quad (15)$$

This parallel loading scheme enables all the basis coefficients in a 8192 point signal to be computed in 106,436 clock cycles. When running at 50 MHz, the chip calculates all basis coefficients in 0.002089 seconds. If parallel loading is not used, 204,788 clock cycles are required to compute all of the Adaptive Wavelet coefficients in a 8192 point signal.

Circuit Board.

Figure 17:
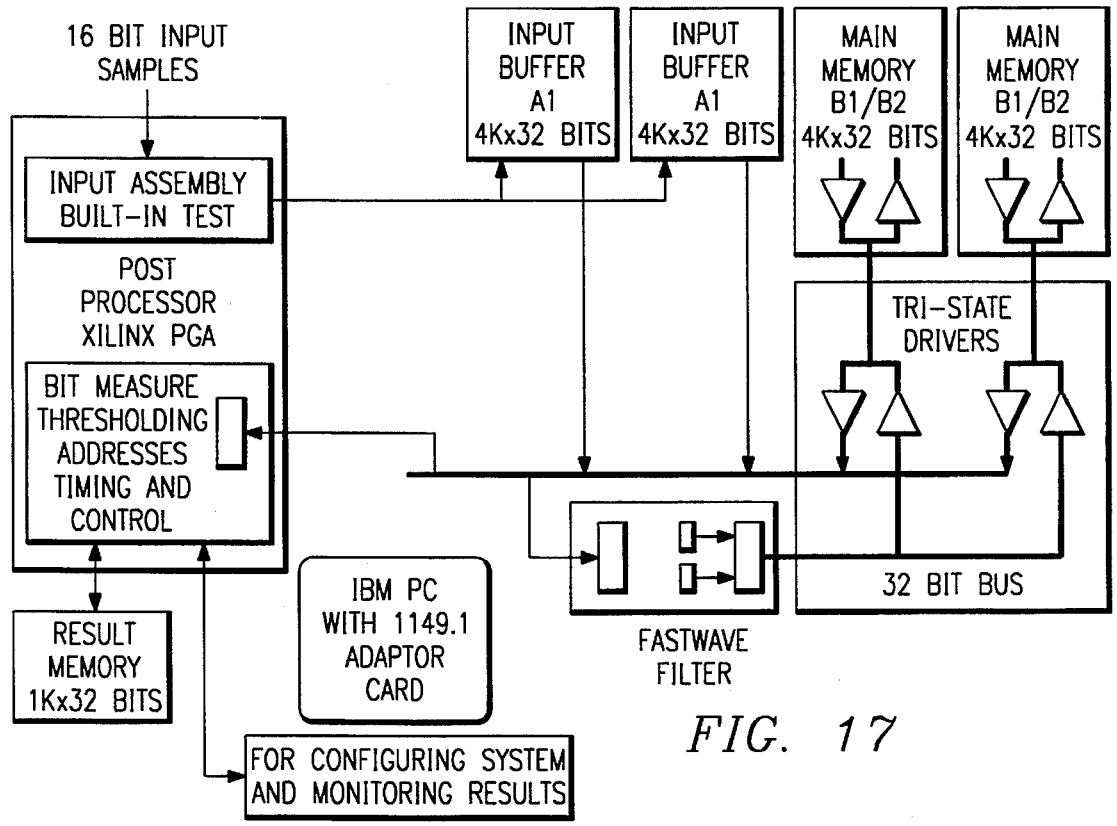
FIG. 17 is a block diagram of the circuit board.

The invention also includes a circuit board containing the filter integrated circuit which rapidly performs all three steps required in the present embodiment: 1) computation of basis coefficients, 2) selection of best basis, and 3) coding of the resulting coefficients. The block diagram of the circuit board is shown in FIG. 17, it contains the following elements for operation on a real-time signal in 8192 point segments:

1) The Filter Integrated Circuit,
2) Two 8K×32 bit temporary memory banks B1/B2 and B3/B4,
3) Two 8K×8 bit memories A1 and A2 to store the input signal,
4) A Tri-State Driver Integrated Circuit,
5) A Programmable Gate Array (PGA) integrated circuit to perform best basis selection, address generation and system control,
6) Final Result Storage memory.

Operation of the Circuit Board.

The signal is read into memory bank A1 or A2 from the interface bus (for example the board may be installed into a PC bus). Note that the input bus is independent of the processing bus so that a signal segment can be read in while the previous segment is being compressed. Input segments are alternately stored in A1 and A2 while the previous segment (in the opposite memory) is being compressed.

Figure 18:
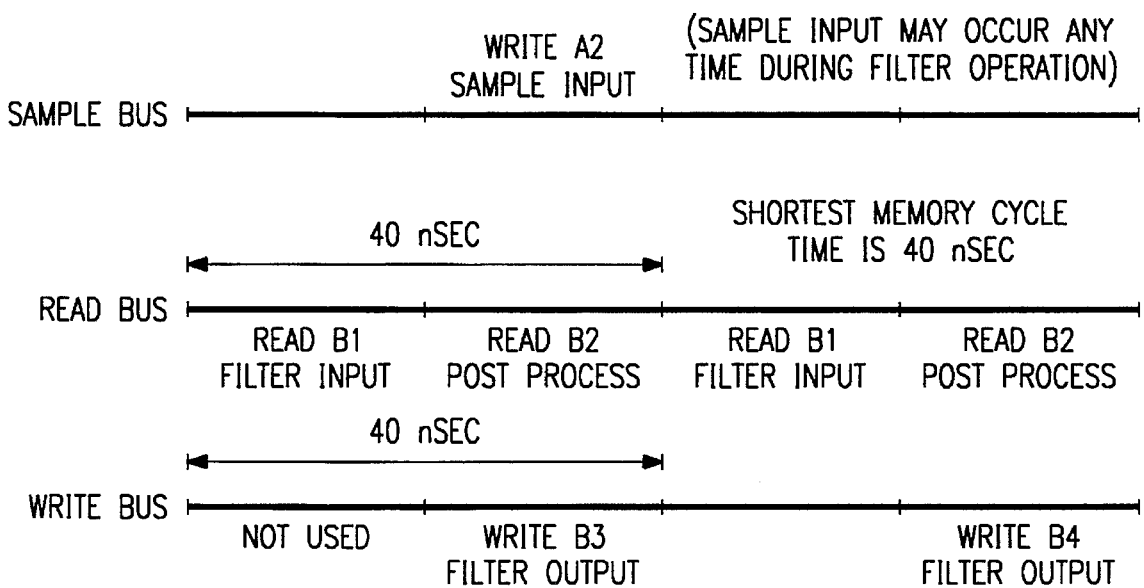
FIG. 18 is the read/write sequence for computation of the first scale wavelet coefficients.

The filter integrated circuit and memories B1/B2 and B3/B4 implement the wavelet coefficient computation. The memory read/write sequence for computation of the first scale coefficients is shown in FIG. 18. The filter integrated circuit input is 32-bits so that only one memory read for every two input samples is required. Since the filter integrated circuit runs at 50 MHz (T= 20 nsec), a memory read must occur every 40 nsec.

The filter integrated circuit output is also 32-bits wide. The low-pass $\{c^1(n): n \leq 0, \ldots, (N/2)-1\}$ coefficients, which represent the signal in the N/2 H regions in FIG. 6, and the high-pass $\{d^1(n): n=0, \ldots, (N/2)-1\}$ coefficients, which represent the signal in the N/2 G regions of FIG. 6, appear once every 80 nsec. In the first 40 nsec slot, $c^1(n)$ is in the lower 16 bits of the output and $c^1(n+1)$ is in the upper 16 bits. In the next 40 nsec slot, $d^1(n)$ is in the lower 16 bits of the output and $d^1(n+1)$ is in the upper 16 bits. The low-pass outputs are written into memory B1, while the high-pass outputs are written into memory B2.

Figure 19:
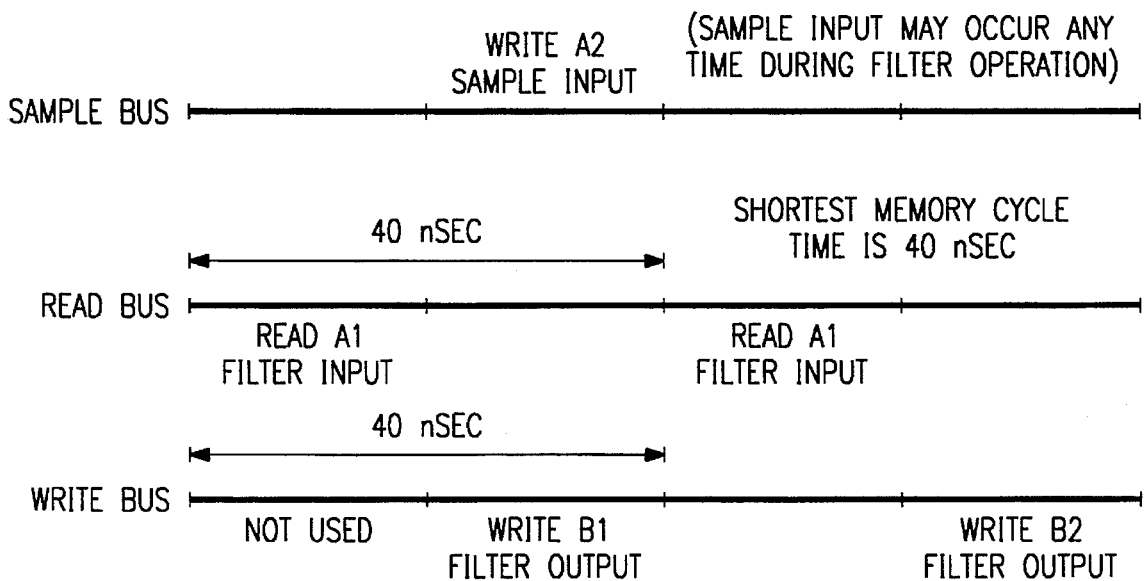
FIG. 19 is the read/write sequence for computation of the second scale wavelet coefficients.

Computation of the second scale coefficient beings while posting processing starts on the first scale coefficients as shown in FIG. 19. Post processing consists of: 1) computing the bit measure given in Equation (6), 2) quantizating the coefficients, and 3) recording the coefficient location. The Scale 1 coefficients $\{c^1(n):n=0, \ldots, (N/2)-1\}$ are read out of B1 and the $\{cc^2(n):n=0, \ldots, (N/4)-1\}$ coefficients (which represent the signal in the N/4 HH regions in FIG. 6) are written into B3 and the $\{cd^2(n):n=0, \ldots, (N/4)-1\}$ coefficients (which represent the signal in the N/4 HG regions in FIG. 6) are written into B4. Meanwhile, the coefficients $\{d^1(n):n=0, \ldots, (N/2)-1\}$ are read from B2 and sent to the post processor. Next, the Scale 1 coefficients $\{d^1(n):n=0, \ldots, (N/2)-1\}$ are read out of B2 and the $\{dc^2(n):n=0, \ldots, (N/4)-1\}$ coefficients (which represent the signal in the N/4 GH regions in FIG. 6) are written into B3 and the $\{dd^2(n):n=0, \ldots, (N/4)-1\}$ coefficients (which represent the signal, in the N/4 GG regions in FIG. 6) are written into B4. Simultaneously, the coefficients $\{c^1(n):n=0, \ldots, (N/2)-1\}$ are read from B1 and sent to the post processor. At this point, the Scale 1 coefficients are no longer needed (because the important ones have been saved in the result memory) and can be written over by the Scale 3 coefficients. This process continues until he final scale coefficients are computed (scale $\log_2 N$).

The post processing computations and memory address control are implemented in a field programmable gate array (FPGA) chip. FPGAs are user-programmable, high-density application specific integrated circuits that implement user-defined logic functions by interconnecting logic gates into complex functions. FPGAs contain an interior matrix of logic blocks and a surrounding ring of I/O interface blocks. Interconnection resources occupy the channels between the rows and columns of logic blocks and between the logic blocks and the I/O blocks. The functions of the logic blocks, the I/O blocks and the interconnections are controlled by a configuration program stored in an on-chip memory. The configuration program can be loaded automatically on power-up of the FPGA.

Figure 20:
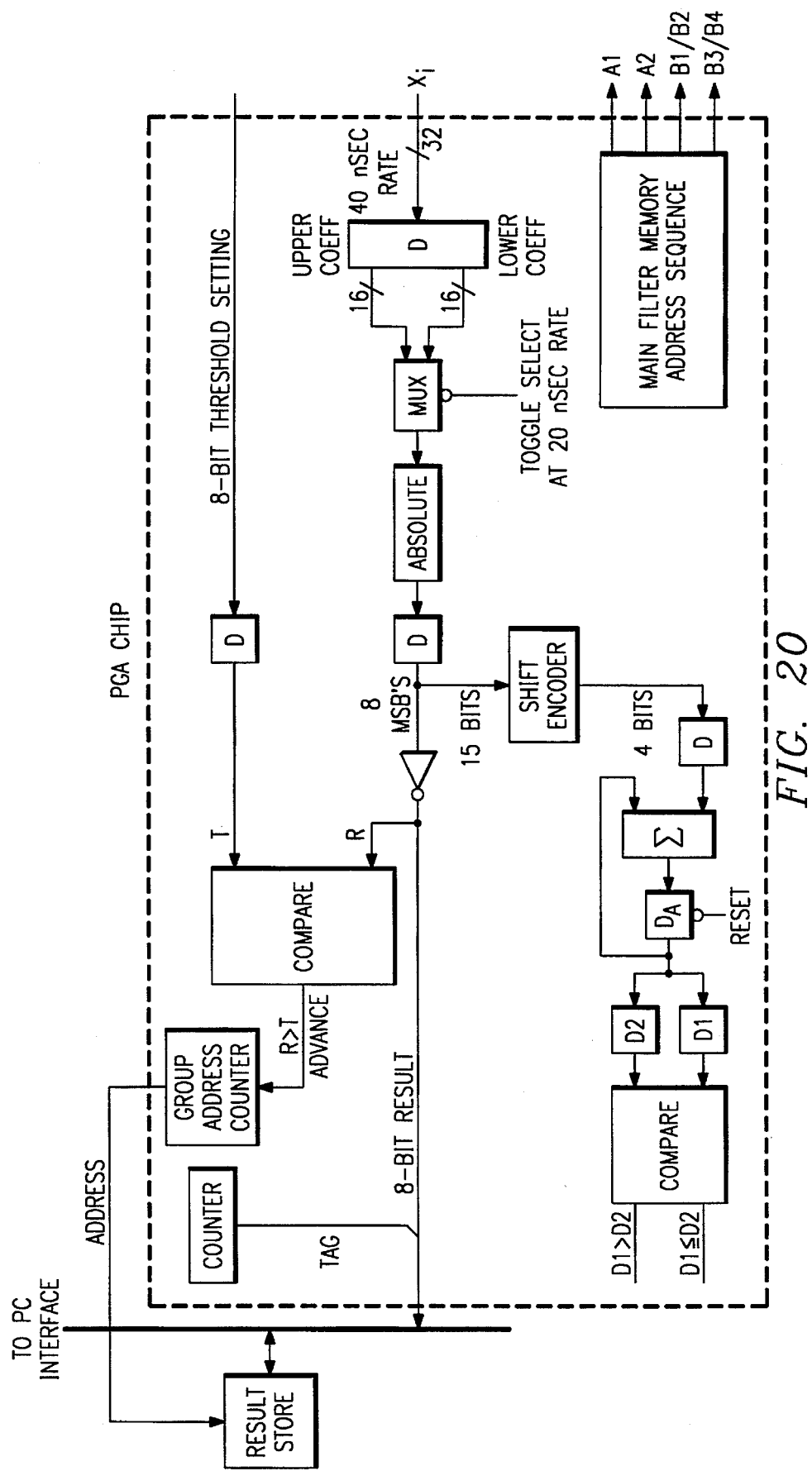
FIG. 20 is a block diagram of the post processor.

The post processor is shown in FIG. 20. This processor implements computation of the bit measure given in Equation (6) for each coefficient group. When a group's bit measure indicates that the group should be saved, the following information is retained in the result memory:

a) the group address;

b) the bit measure;

c) the coefficient values which are above threshold (quantized to 8 bits); and d) the offset from the previous saved coefficient in the group.

This information is temporarily stored in uncoded form in memory P1. After all coefficients have been computed and processed, the quantized values are Huffman coded using a fixed Huffman Table. The offsets are also Huffman coded using a fixed Huffman Table. The bit measures do not need to be saved at all. The group address information is reduced to typically about 300–500 bits for an 8192 point signal.

Although the invention has been described with reference to the above-specified embodiments, this description is not meant to be construed in a limiting sense. Various modifications of the disclosed embodiment, as well as alternative embodiments of the invention, will become apparent to persons skilled in the art upon reference to the above description. It is, therefore, contemplated that the appended claims will cover such modifications that fall within the true scope of the invention.

What is claimed is:

1. A method of compressing a data signal comprising the steps of:

computing basis coefficients corresponding to basis functions of a data signal using wavelet mathematics wherein the basis functions are separated into a plurality of sets, Set 1 through Set M of basis functions having varying time-frequency characteristics, with said Set 1 being narrow in time and broad in frequency, Set M being long in time and narrow in frequency, and Set 2 through Set M-1 being progressively more narrow in frequency and longer in time; and selecting a best group of basis coefficients to reconstruct the data signal by selecting a group of basis coefficients that concentrates most of the data signal's energy into a smallest number of basis coefficients.

2. The method of claim 1, wherein said step of computing is accomplished by using no multipliers.

3. The method of claim 1, wherein said step of computing is accomplished for a set of basis coefficients by using only a previous set of basis coefficients.

4. The method of claim 3, wherein said step of computing is accomplished by using a filter chip that contains circuitry to load said previous set of basis coefficients in serial and in parallel.

5. The method of claim 1, wherein said step of computing is accomplished by using a filter chip that alternately computes wavelet low-frequency filter outputs and wavelet high-frequency filter outputs.

6. The method of claim 1, wherein said step of selecting is accomplished by using a bit measure that measures a number of bits used to optimally encode basis coefficients of each possible group of basis coefficients used to reconstruct the data signal and by selecting a group of basis coefficients having a lowest bit measure.

7. The method of claim 6, wherein said step of selecting is accomplished by using a shift encoder and summer to determine the bit measure for each possible group of basis coefficients.

8. The method of claim 1, wherein said step of selecting is accomplished by using a property of wavelet mathematics that results in basis coefficients that are orthogonal in time and frequency to determine which group of basis coefficients concentrates most of the data signal's energy into a smallest number of basis coefficients.

9. The method of claim 1, further comprising the step of coding information related to the selected group of basis coefficients.

10. The method of claim 9, wherein said step of coding further comprises the steps of:

ordering basis coefficients in said selected group of basis coefficients in descending order of magnitude;

quantizing a magnitude of each of said basis coefficients in said selected group of basis coefficients;

subtracting said magnitude of each of said basis coefficients from a magnitude of a previous basis coefficient in said selected group of basis coefficients;

coding results of the step of subtracting using an entropy-based method;

assigning addresses to each of said basis coefficients according to a time and frequency region covered;

subtracting the address of each basis coefficient from the address of the previous basis coefficient and eliminating addresses of basis coefficients which cannot be used because they overlap in time or frequency with one or more previously used basis coefficients of said selected group of basis coefficients; and coding results from said step of subtracting addresses using an entropy-based method.

11. An apparatus for compressing a data signal, comprising:

a plurality of low-pass and high-pass decomposition wavelet filters operable to operate on a data signal to computed basis coefficients corresponding to basis functions of the data signal, wherein the basis functions are separated into a plurality of sets, Set 1 through Set M of basis functions that have varying time-frequency characteristics, with Set 1 being narrow in time and broad in frequency, Set M being long in time and narrow in frequency, and Set 2 through Set M-1 being progressively more narrow in frequency and longer in time;

comparison circuitry coupled to the plurality of wavelet filters and operable to compare said basis coefficients and select a group of basis coefficients to reconstruct the data signal which can be coded with a smaller number of bits than any other group of basis coefficients which alternately could be used to reconstruct the data signal;

ordering circuitry coupled to the comparison circuitry and operable to order the selected group of basis coefficients in descending order of magnitude;

quantization circuitry coupled to the ordering circuitry and operable to quantize a magnitude of each basis coefficient in the selected group of basis coefficients;

magnitude subtracting circuitry coupled to the quantization circuitry and operable to subtract the magnitude of each basis coefficient from a magnitude of a previous basis coefficient in the selected group of basis coefficients;

coding circuitry coupled to the magnitude subtracting circuitry and operable to code the results of subtracting magnitudes using an entropy-based method;

addressing circuitry coupled to the coding circuitry and operable to assign addresses to each basis coefficient in the selected group of basis coefficients according to time and frequency regions covered;

address subtracting circuitry coupled to the addressing circuitry and operable to subtract the address of each basis coefficient in the selected group of basis coefficients from the address of the previous basis coefficient and to eliminate the addresses of basis coefficients which cannot be used because they overlap in time or frequency with one or more previously used basis coefficients in the selected group of basis coefficients;

coding circuitry coupled to the address subtracting circuitry and operable to code the results of subtracting addresses using an entropy-based method; and decompression circuitry coupled to and operable to use the comparison circuitry, the ordering circuitry, the quantization circuitry, the magnitude subtracting circuitry, the coding circuitry, the addressing circuitry, the address subtracting circuitry, and the coding circuitry and operable to apply the result to a plurality of reconstruction wavelet filters to reconstruct the data signal.

12. The apparatus of claim 11, wherein said wavelet filters contain no multipliers.

13. The apparatus of claim 11, wherein said wavelet filters further comprise:

parallel loading circuitry operable to load a previous group of basis coefficients in parallel.

14. The apparatus of claim 11, wherein said comparison circuitry comprises:

shifter circuitry operable to shift bits of said basis coefficients to determine a number of bits required to encode each of said basis coefficients;

adder circuitry Coupled to the shifter circuitry and operable to add the number of bits required to represent each basis coefficient in a group of basis coefficients associated with a time region and a frequency region; and storage circuitry coupled to the adder circuitry and operable to store a result of said adder circuitry, and further operable to select a group of said basis coefficients having a lowest added total of required bits associated with said frequency region.

15. The apparatus of claim 11, wherein said decomposition and reconstruction wavelet filters further comprise:

circuitry that implements a low-pass decomposition filter using a two-sum filter equation, comprising:

circuitry that operates to implement samples of the data signal in two's complement form using a number of bits B;

a low-pass wavelet decomposition filter comprising L low-pass coefficients;

circuitry that operates to compute an inner sum over the L low-pass coefficients comprising each low-pass coefficient multiplied a bth bit of a shifted sample of the data signal; and circuitry that operates to compute an outer sum over a bit counter b wherein each result of the inner sum is shifted by b bits and wherein b ranges from zero to the number of bits B;

circuitry that computes the inner sum of the two-sum filter equation using a ROM look-up table which is addressed by the bits of the samples of the data signal;

circuitry that computes the outer sum using an adder and shifter;

circuitry that computes a high-pass decomposition wavelet filter using the two-sum filter equation where high-pass decomposition filter coefficients are obtained by reordering the L low-pass decomposition coefficients;

circuitry that computes the low-pass reconstruction wavelet filter using the two-sum filter equation where the low-pass reconstruction filter coefficients are obtained by reordering the L low-pass decomposition coefficients; and circuitry that computes the high-pass reconstruction wavelet filter using the two-sum filter equation where the high-pass reconstruction filter coefficients are obtained by reordering the L low-pass decomposition coefficients.

16. The apparatus of claim 11, wherein the plurality of wavelet filters compute basis coefficients for a set of basis coefficients by using only a previous set of basis coefficients.

17. A method for compressing and decompressing a data signal, comprising the steps of:

operating on a data signal using a plurality of low-pass and high-pass decompression wavelet filters to compute basis coefficients corresponding to basis functions of the data signal, wherein the basis functions are separated into a plurality of sets, Set 1 through Set M of basis functions that have varying time-frequency characteristics, with Set 1 being narrow in time and broad in frequency, Set M being long in time and narrow in frequency, and Set 2 through Set M-1 being progressively more narrow in frequency and longer in time;

comparing said basis coefficients and selecting a group of basis coefficients to reconstruct the data signal which can be coded with a smaller number of bits than any other group of basis coefficients which alternately could be used to reconstruct the data signal;

ordering the selected group of basis coefficients in descending order of magnitude;

quantizing a magnitude of each basis coefficient in the selected group of basis coefficients;

subtracting the magnitude of each basis coefficient from a magnitude of a previous basis coefficient in the selected group of basis coefficients;

coding the results of the step of subtracting magnitudes using an entropy-based method;

assigning addresses to each basis coefficient in the selected group of basis coefficients according to time and frequency regions covered;

subtracting the address of each basis coefficient in the selected group of basis coefficients from the address of the previous basis coefficient and eliminating the addresses of basis coefficients which cannot be used because they overlap in time or frequency with one or more previously used basis coefficients in the selected group of basis coefficients;

coding the results of the step of subtracting addresses using an entropy-based method; and decompressing the data signal by performing the steps of comparing and selecting, of quantizing, of subtracting magnitudes, of coding results, of subtracting addresses, and of coding results in revere order, and operating on the result with reconstruction wavelet filters to reconstruct the data signal.

18. The method of claim 17, wherein said step of operating on the data signal to compute basis coefficients involves no multipliers.

19. The method of claim 17, wherein said step of operating on the data signal further comprises the steps of:

expressing a low-pass decomposition wavelet filter in a two-sum filter equation, the two-sum filter equation comprising:
samples of the data signal expressed in two's complement form using a number of bits B;
a low-pass wavelet decomposition filter comprising L low-pass coefficients;
an inner sum over the L low-pass coefficients comprising each low-pass coefficient multiplied by the bth bit of a shifted sample of the data signal; and
an outer sum over a bit counter b wherein each result of the inner sum is shifted by b bits and wherein b ranges from zero to the number of bits B;

computing the inner sum of the two-sum filter equation using a ROM look-up table which is addressed by the bits of the samples of the data signal;

computing a high-pass decomposition wavelet filter using the two-sum filter equation where high-pass decomposition filter coefficients are obtained by reordering the L low-pass decomposition coefficients.

20. The method of claim 19, wherein the step of decompressing the data signal further comprises the steps of:

computing the low-pass reconstruction wavelet filter using the two-sum filter equation where the low-pass reconstruction filter coefficients are obtained by reordering the L low-pass decomposition coefficients; and computing the high-pass reconstruction wavelet filter using the two-sum filter equation where the high-pass reconstruction filter coefficients are obtained by reordering the L low-pass decomposition coefficients.

21. The method of claim 20, wherein said step of decompressing the data signal further comprises:

using a wavelet filter chip employing the reordering of low-pass decomposition coefficients so that low-pass filter outputs and high-pass filter outputs are computed on alternating clock cycles.

22. The method of claim 19, wherein said step of operating on the data signal further comprises:

using a wavelet filter chip employing the reordering of low-pass decomposition coefficients so that low-pass filter outputs and high-pass filter outputs are computed on alternating clock cycles.

23. The method of claim 17, wherein said step of operating on the data signal is accomplished for a set of basis coefficients by using only a previous set of basis coefficients.

24. The method of claim 17, wherein said step of comparing comprises the steps of:

shifting bits of said basis coefficients to determine a number of bits required to encode each of said basis coefficients;

adding the number of bits required to encode each basis coefficient in a group of basis coefficients associated with a time region and a frequency region; and storing a result of said adding, and selecting a group of said basis coefficients having a lowest added total of required bits associated with said frequency region.

25. A method of computing wavelet coefficients of a data signal and reconstructing the data signal from the wavelet coefficients, comprising the steps of:

expressing a low-pass decomposition wavelet filter in a two-sum filter equation, the two-sum filter equation comprising:
samples of the data signal expressed in two's complement form using a number of bits B;
a low-pass wavelet decomposition filter comprising L low-pass coefficients;
an inner sum over the L low-pass coefficients comprising each low-pass coefficient multiplied by a bth bit of a shifted sample of the data signal; and
an outer sum over a bit counter b wherein each result of the inner sum is shifted by b bits and wherein b ranges from zero to the number of bits B;

computing the inner sum of the two-sum filter equation using a ROM look-up table which is addressed by the bits of the samples of the data signal;

computing the outer sum using an adder and shifter;

computing a high-pass decomposition wavelet filter using the two-sum filter equation where high-pass decomposition filter coefficients are obtained by reordering the L low-pass decomposition coefficients;

computing the low-pass reconstruction wavelet filter using the two-sum filter equation where the low-pass reconstruction filter coefficients are obtained by reordering the L low-pass decomposition coefficients; and computing the high-pass reconstruction wavelet filter using the two-sum filter equation where the high-pass reconstruction filter coefficients are obtained by reordering the L low-pass decomposition coefficients.

26. The method of claim 25, wherein computing wavelet coefficients further comprises:
    using a wavelet filter chip employing the reordering of low-pass decomposition coefficients so that low-pass filter outputs and high-pass filter outputs are computed on alternating clock cycles.

27. The method of claim 25, wherein reconstructing the data signal further comprises:
    using a wavelet filter chip employing the reordering of low-pass decomposition coefficients so that low-pass filter outputs and high-pass filter outputs are computed on alternating clock cycles.

* * * * *